(12) United States Patent
Jung et al.

(10) Patent No.: US 12,704,214 B2
(45) Date of Patent: Aug. 11, 2026

(54) VACUUM ADIABATIC BODY

(71) Applicant: LG ELECTRONICS INC., Seoul (KR)

(72) Inventors: Wonyeong Jung, Seoul (KR); Deokhyun Youn, Seoul (KR); Bongjin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 56 days.

(21) Appl. No.: 18/034,914

(22) PCT Filed: Nov. 1, 2021

(86) PCT No.: PCT/KR2021/015504
§ 371 (c)(1),
(2) Date: May 2, 2023

(87) PCT Pub. No.: WO2022/092934
PCT Pub. Date: May 5, 2022

(65) Prior Publication Data

US 2024/0019073 A1 Jan. 18, 2024

(30) Foreign Application Priority Data

Nov. 2, 2020 (KR) ........................ 10-2020-0144747

(51) Int. Cl.
*F16L 59/065* (2006.01)
*F25D 23/02* (2006.01)
*F25D 23/06* (2006.01)

(52) U.S. Cl.
CPC .......... *F16L 59/065* (2013.01); *F25D 23/028* (2013.01); *F25D 23/063* (2013.01); *F25D 2201/14* (2013.01)

(58) Field of Classification Search
None
See application file for complete search history.

(56) References Cited

U.S. PATENT DOCUMENTS 2,728,958 A * 1/1956 King ........................ F25D 23/02
428/69
2018/0224193 A1 8/2018 Jung et al.
2018/0356147 A1* 12/2018 Jung ..................... F25D 23/062

FOREIGN PATENT DOCUMENTS

CN 205316798 6/2016
CN 109312889 2/2019
(Continued)

OTHER PUBLICATIONS

International Search Report dated Feb. 3, 2022 issued in Application No. PCT/KR2021/015504.
(Continued)

*Primary Examiner* — Joanna Pleszczynska
(74) *Attorney, Agent, or Firm* — KED & ASSOCIATES, LLP

(57) ABSTRACT

A vacuum adiabatic body according to an embodiment may include a first plate, a second plate, and a seal that seals a gap between the first plate and the second plate. Optionally, the vacuum adiabatic body according to an embodiment may include a support that maintains a vacuum space. Optionally, the vacuum adiabatic body according to an embodiment may include a heat transfer resistor that reduces an amount of heat transfer between the first plate and the second plate. Optionally, the vacuum adiabatic body may include a component coupling portion connected to at least one of the first or second plate so that a component is coupled thereto. Optionally, to reduce dew formation, a side plate may have an extension portion extending outwardly of the vacuum space. Accordingly, the vacuum adiabatic body may be improved in productivity.

20 Claims, 20 Drawing Sheets

(56) References Cited

FOREIGN PATENT DOCUMENTS

| | | |
|---|---|---|
| JP | 2011-033079 | 2/2011 |
| KR | 10-2017-0016239 | 2/2017 |
| KR | 10-2017-0016241 | 2/2017 |
| KR | 10-2017-0016242 | 2/2017 |
| KR | 10-2020-0001375 | 1/2020 |

OTHER PUBLICATIONS

Extended European Search Report dated Aug. 8, 2024 issued in Application No. 21886928.7.

* cited by examiner

[Fig. 1]
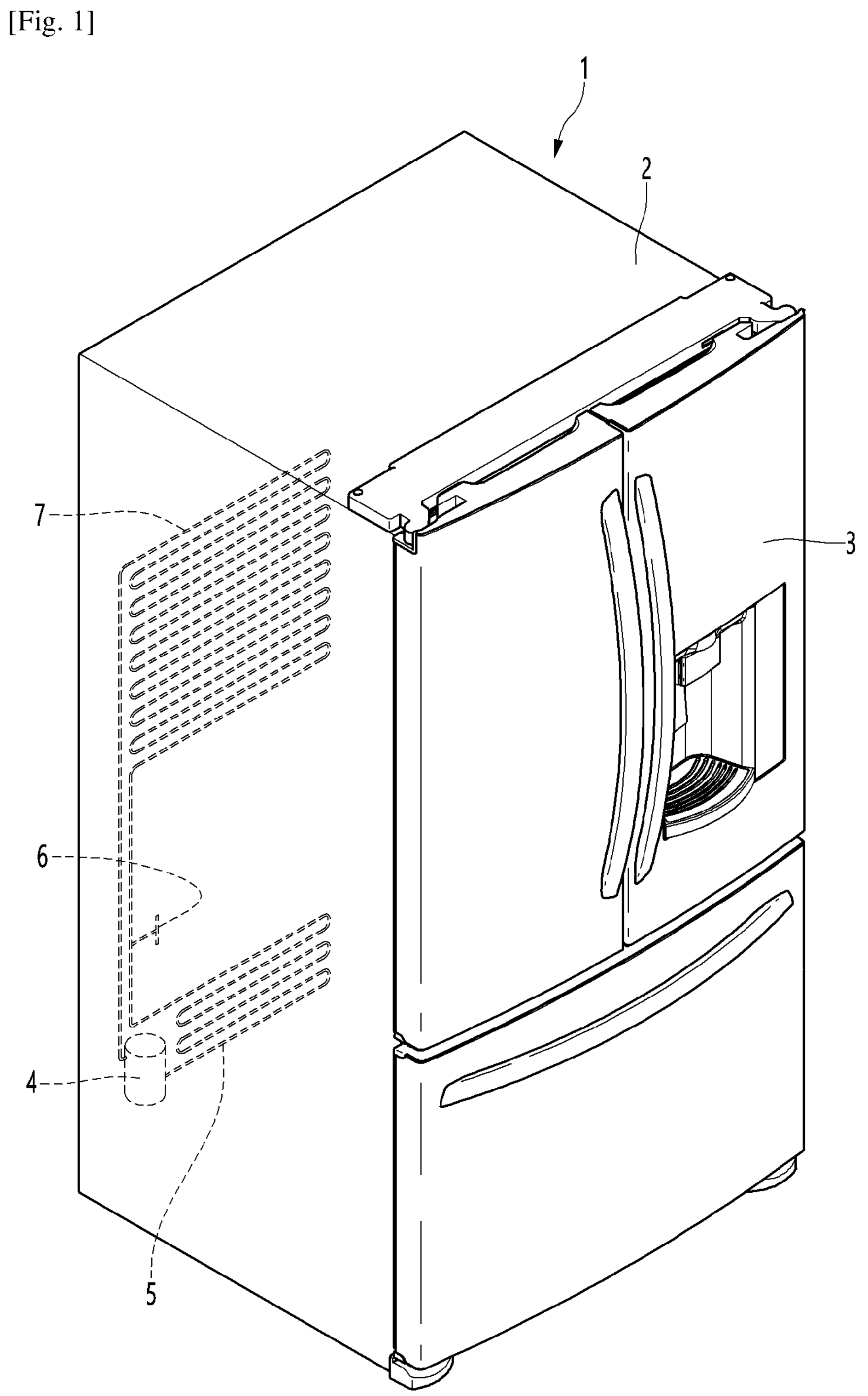

[Fig. 2]
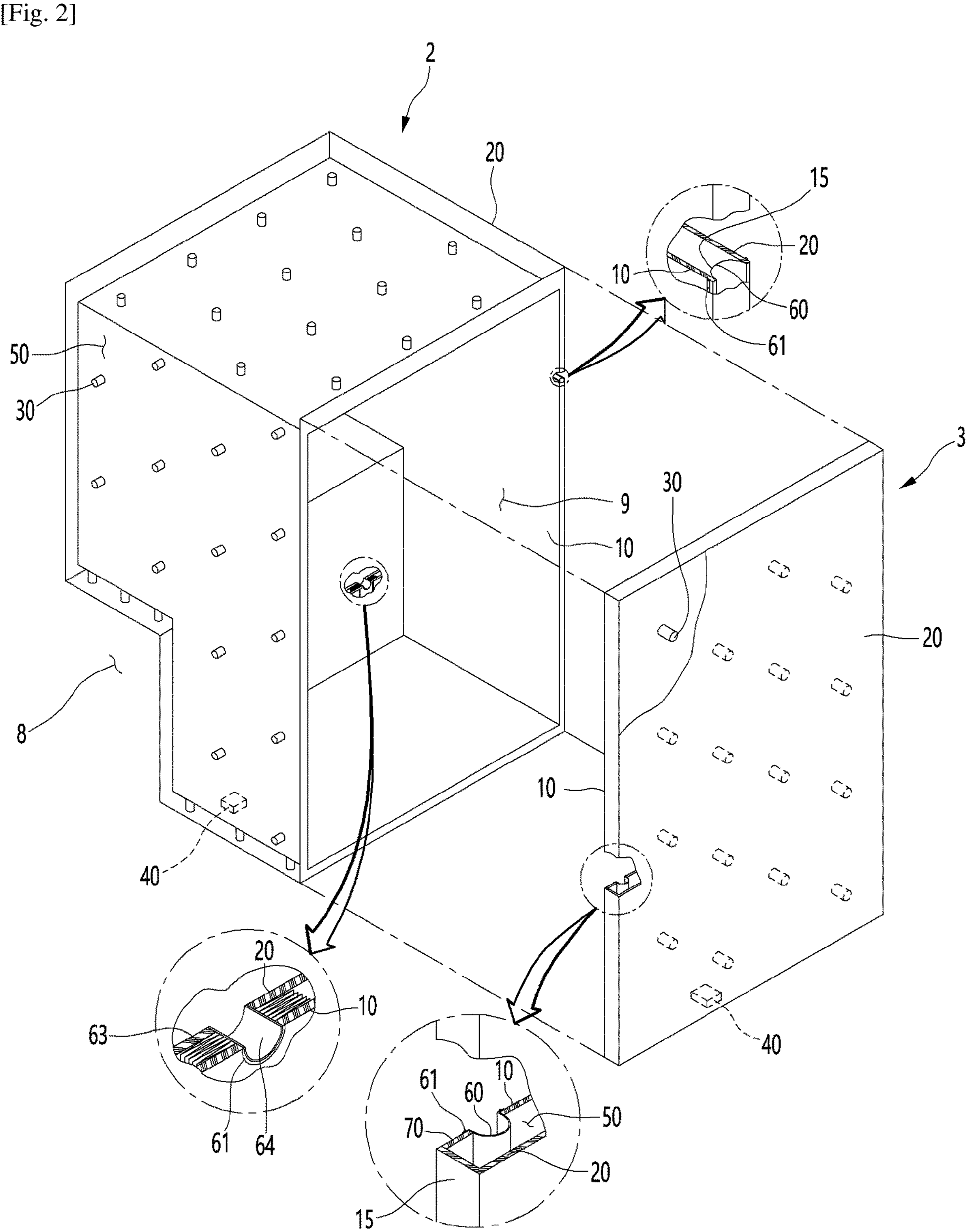

[Fig. 3]
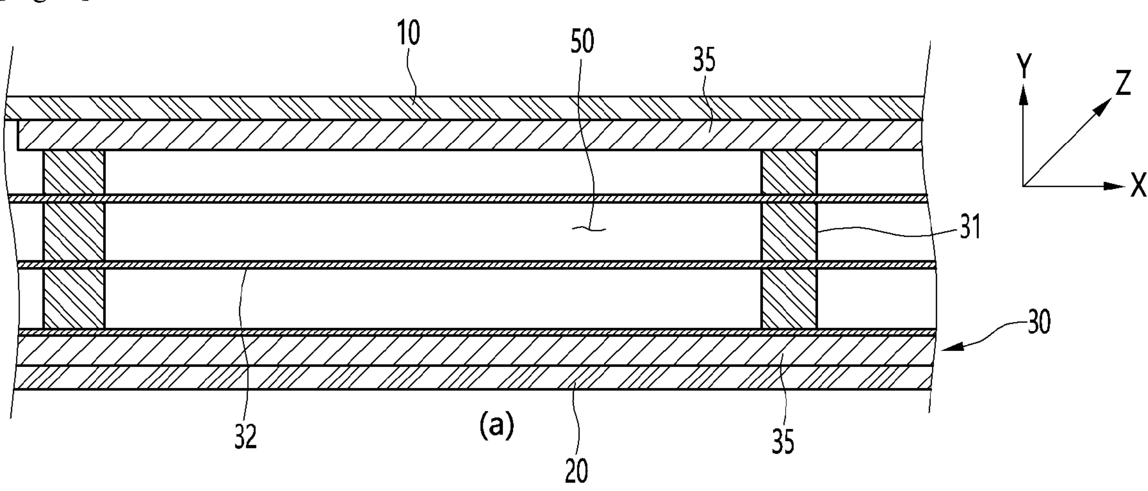
(a)
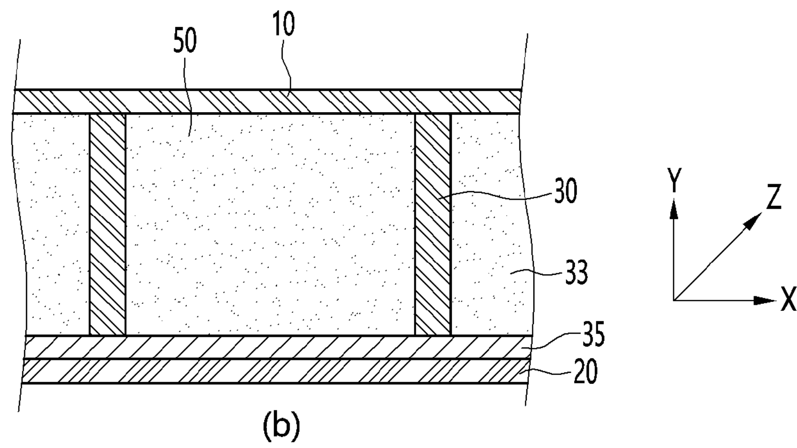
(b)
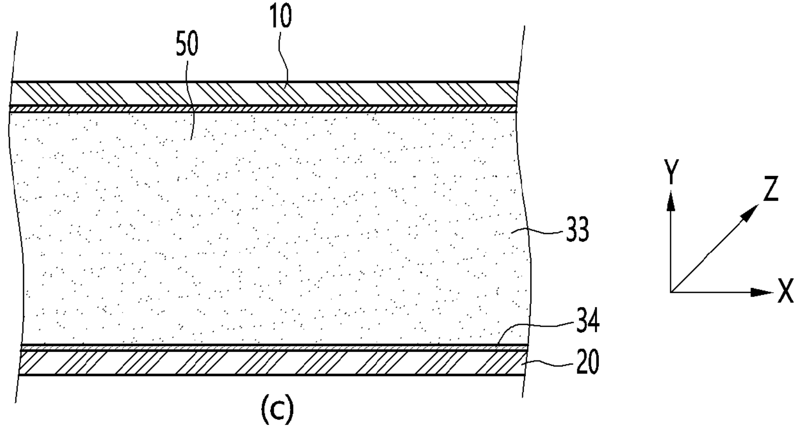
(c)

[Fig. 4]
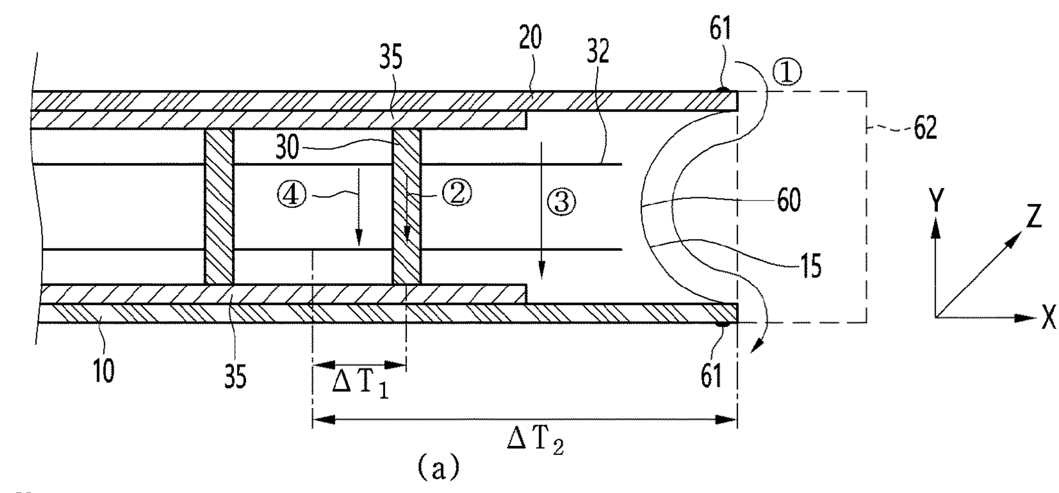
(a)
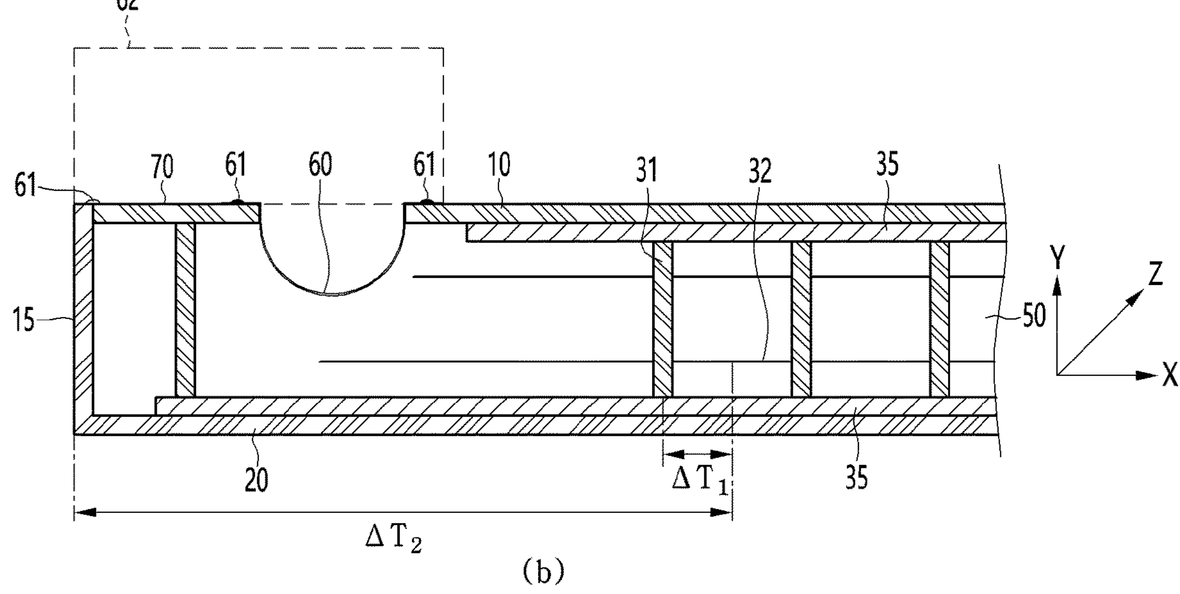
(b)
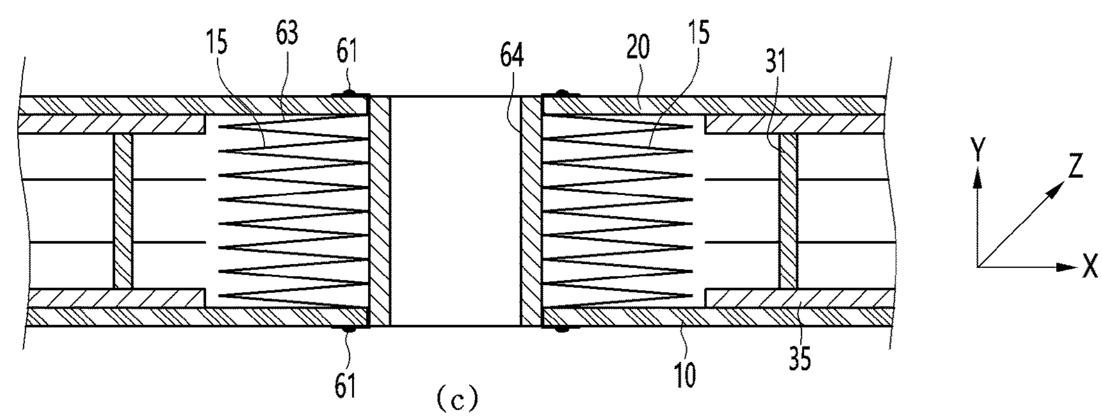
(c)

[Fig. 5]
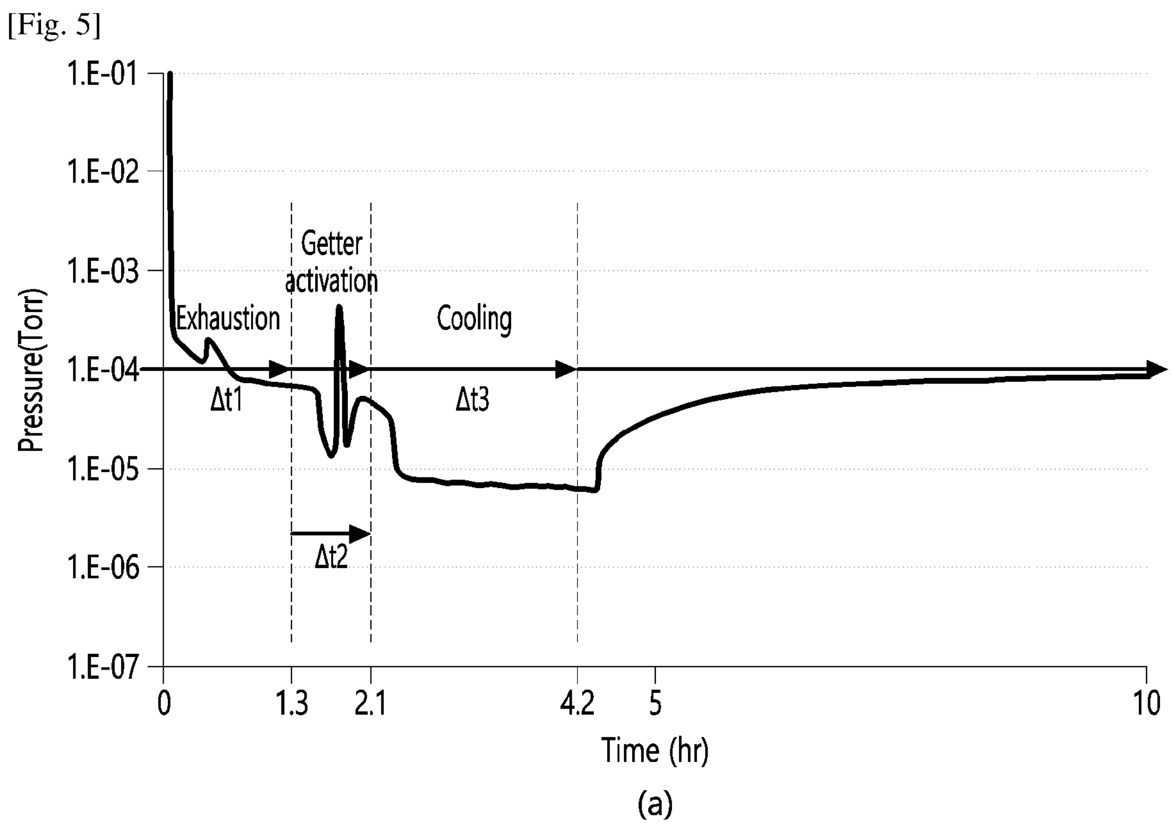
(a)
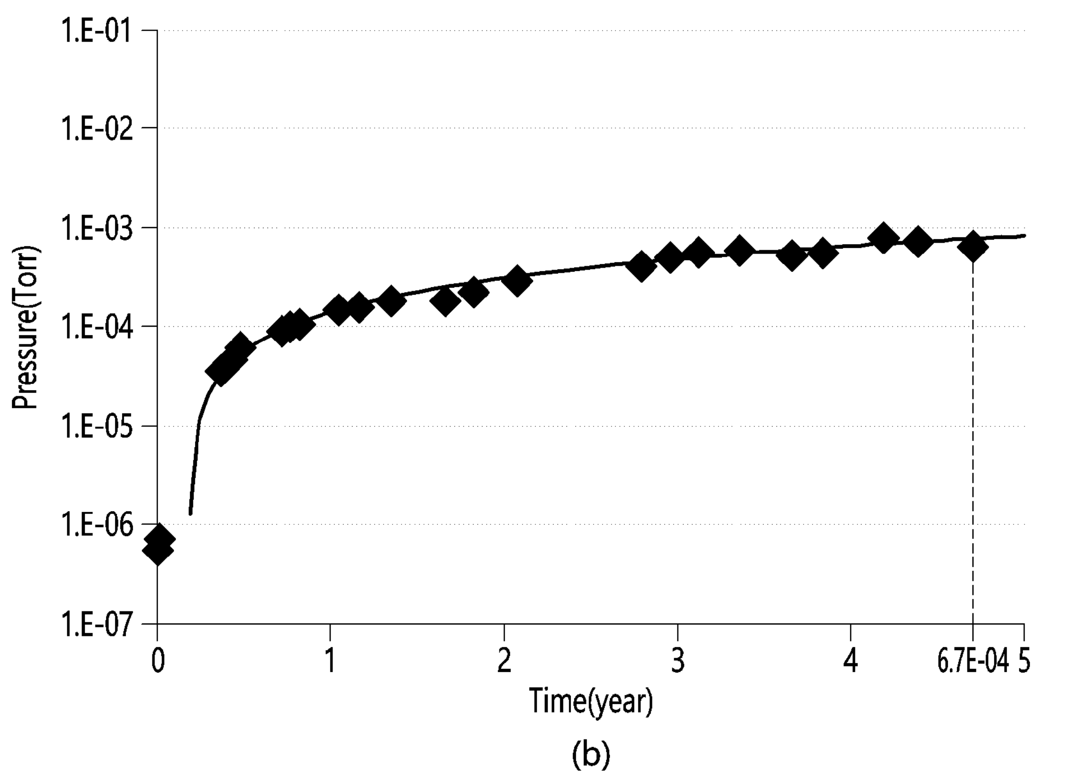
(b)

[Fig. 6]
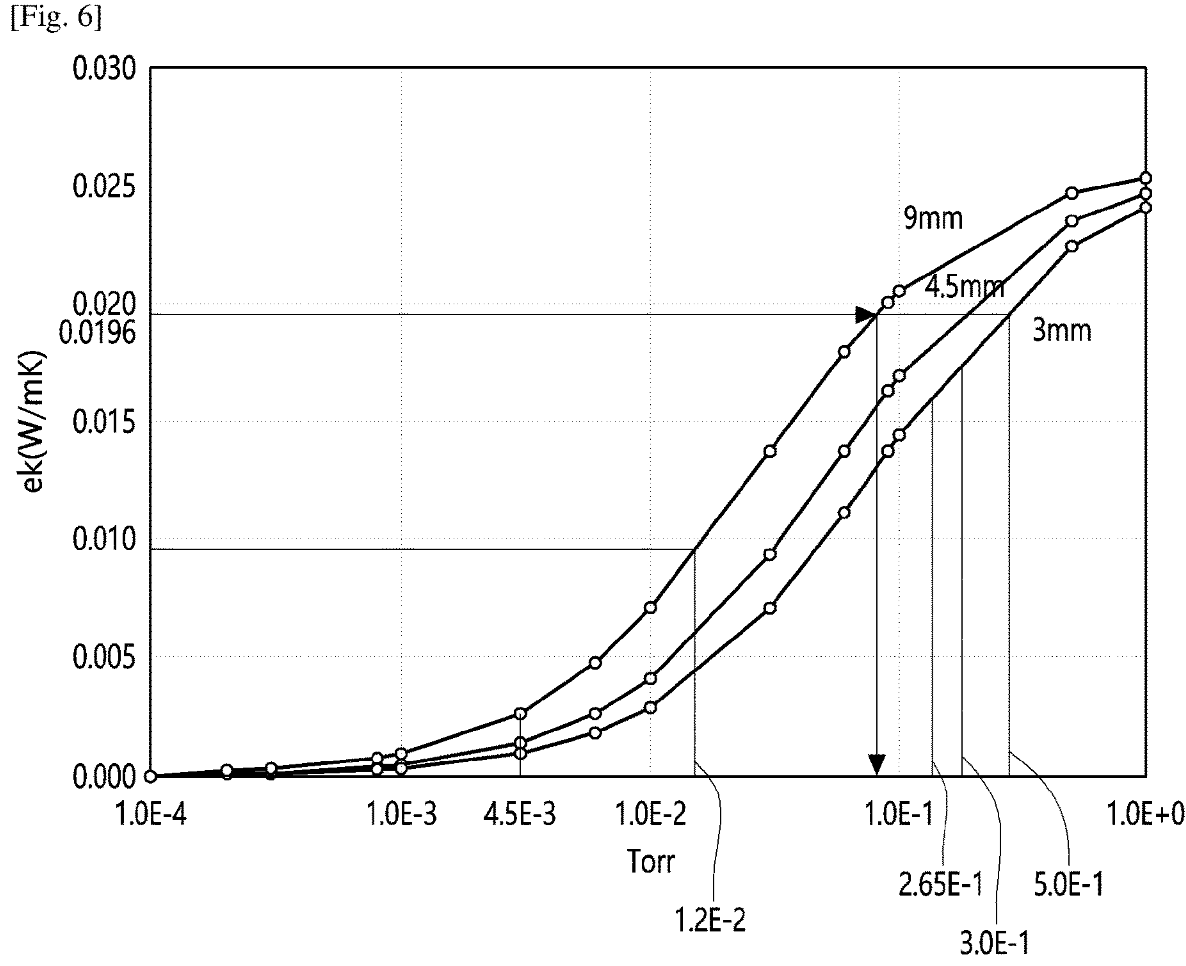

(a)
(b)
(c)
(d)
(e)
(f)
10
20
50
51
51a
51b
101
102
151
152
201
202

FIG. 8
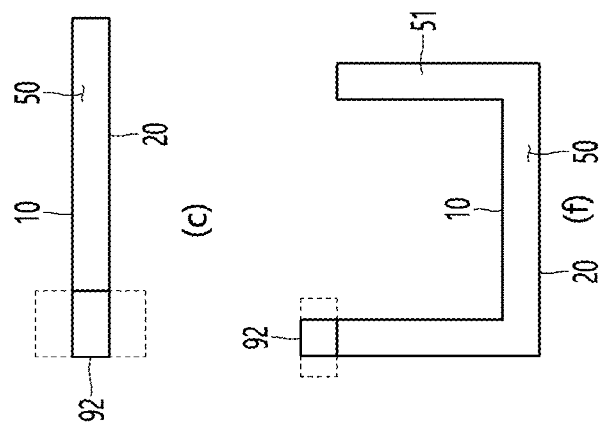
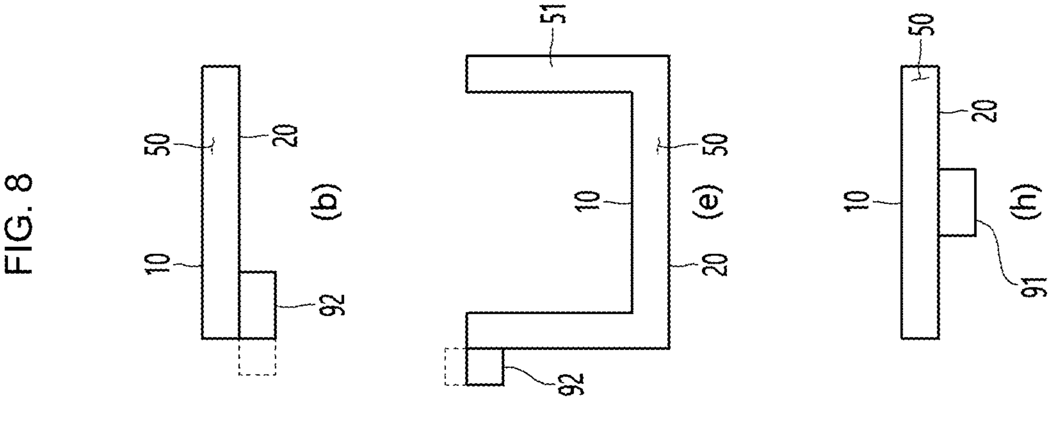
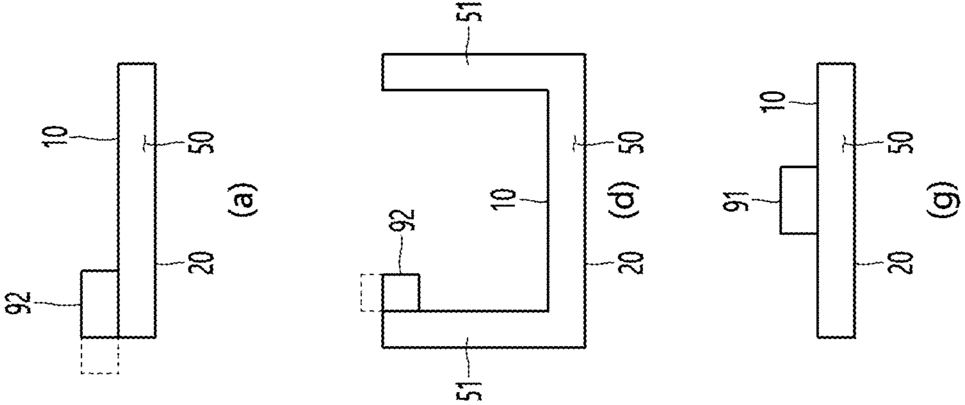

(a)
(b)
(c)
10
20
50
15
102
152
202
203

(a)
(b)
(c)
10
20
50
101
102
104
152
153
202
203
205

[Fig. 13]
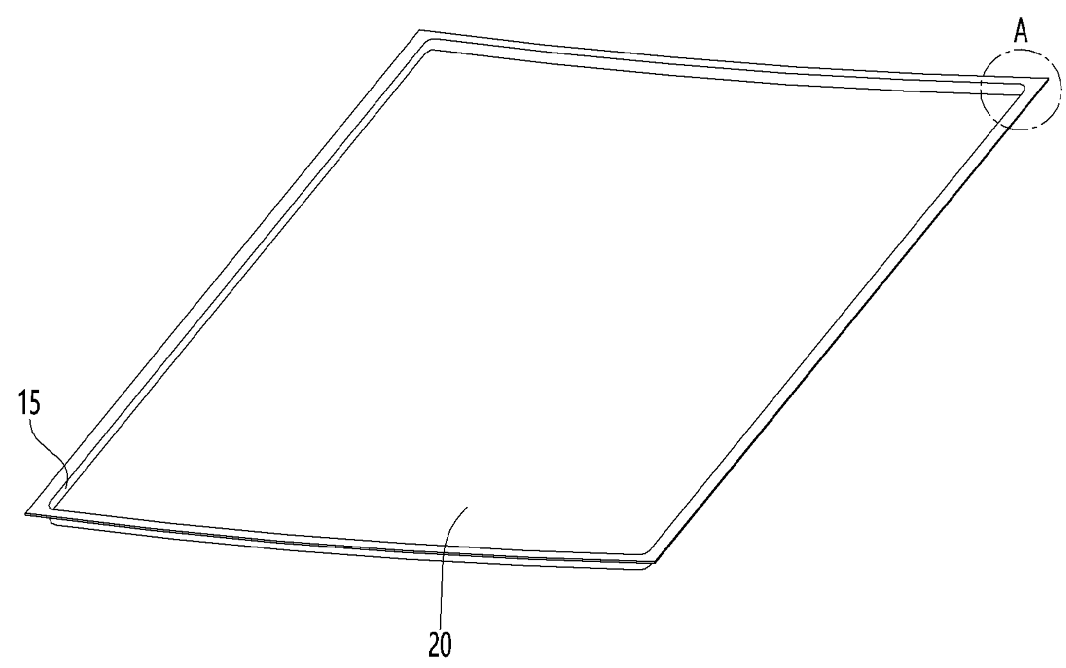
[Fig. 14]
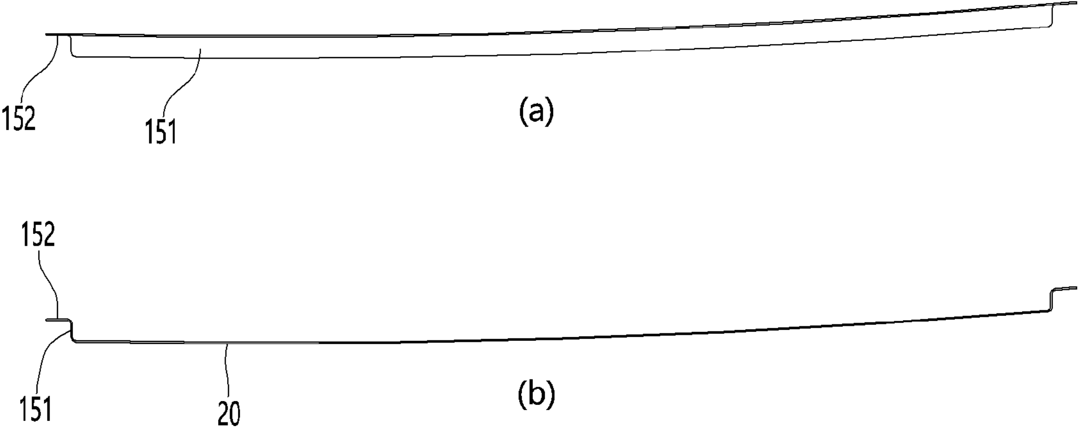
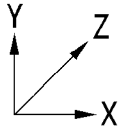

[Fig. 15]
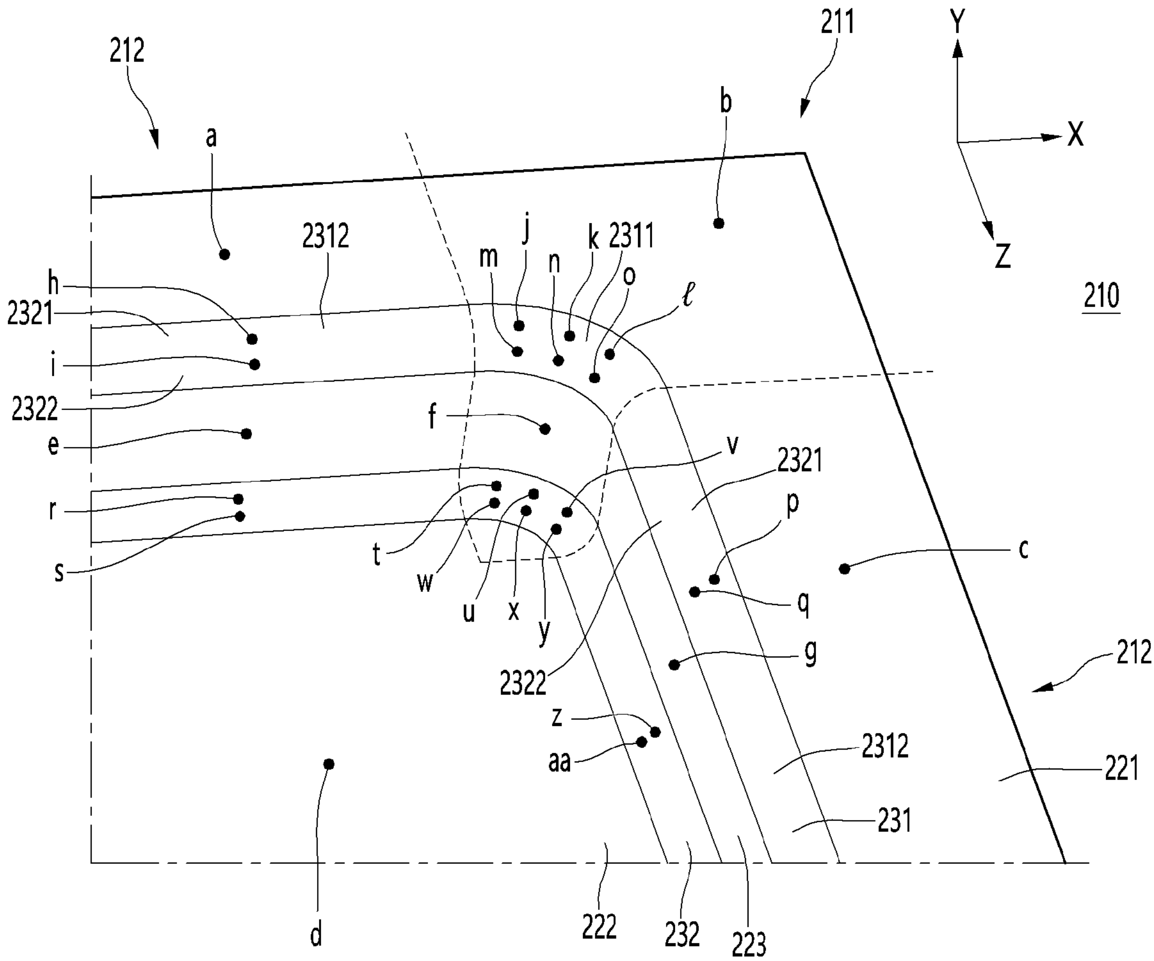
[Fig. 16]
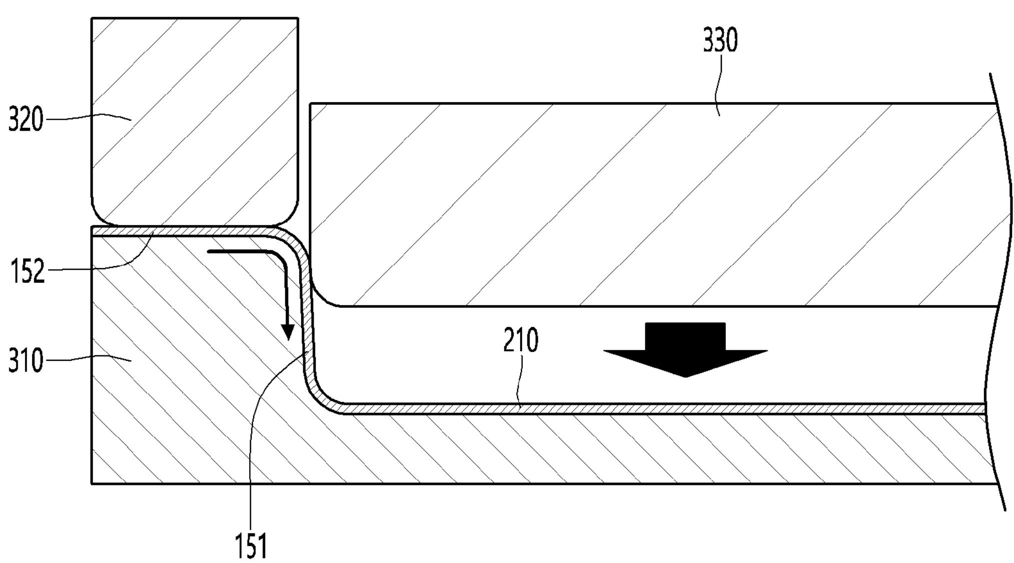

[Fig. 17]
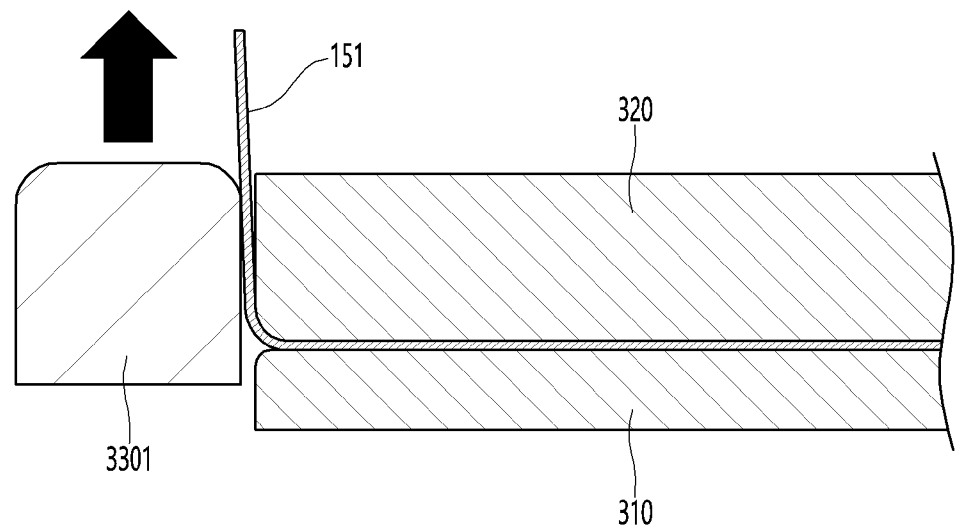
[Fig. 18]
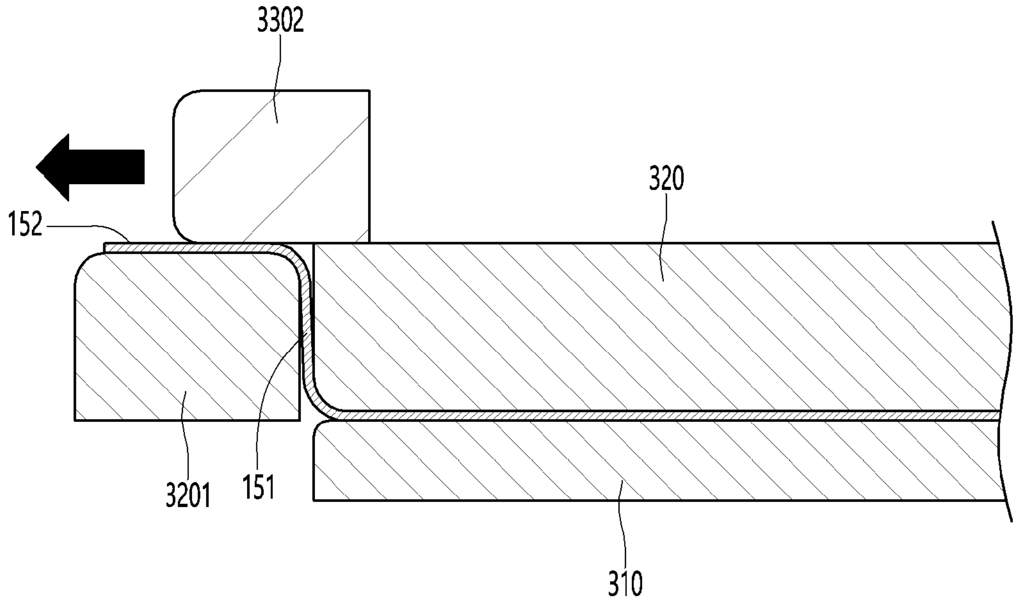

[Fig. 19]
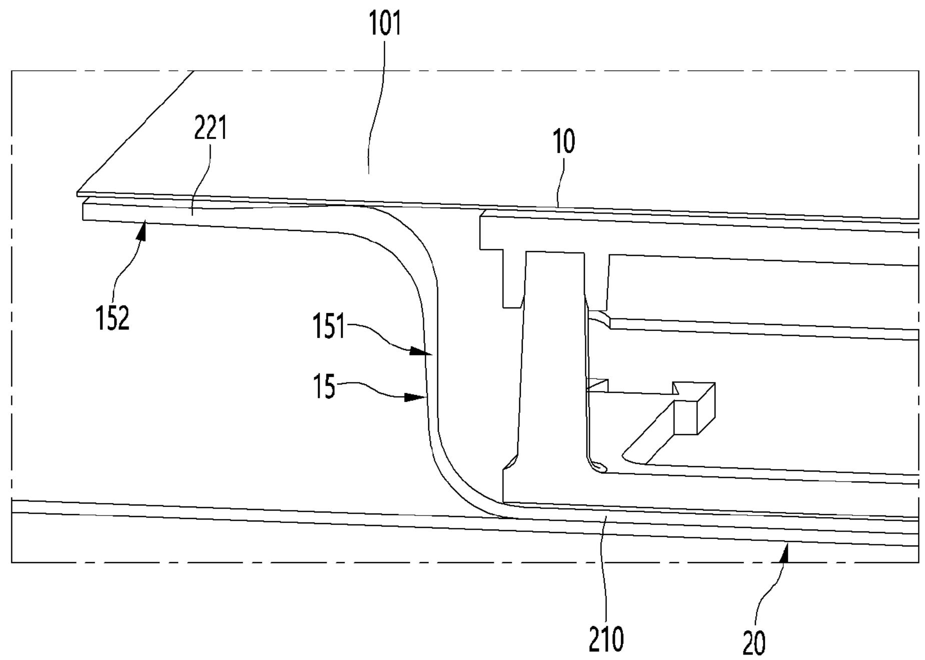
[Fig. 20]
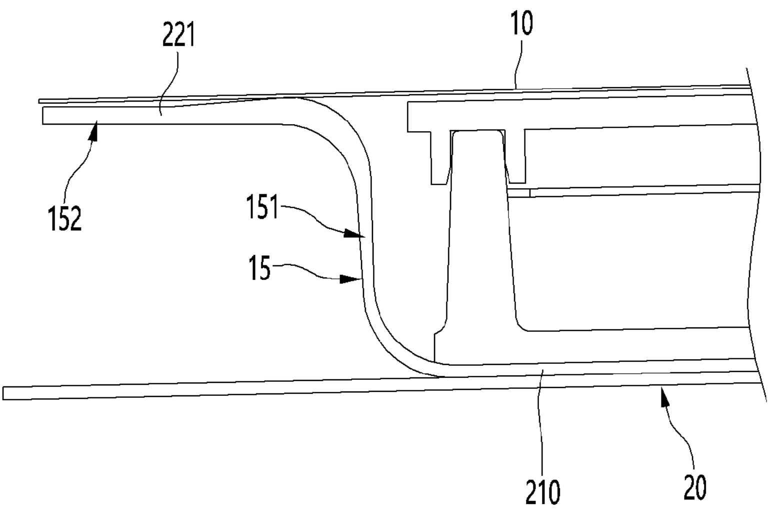

[Fig. 21]
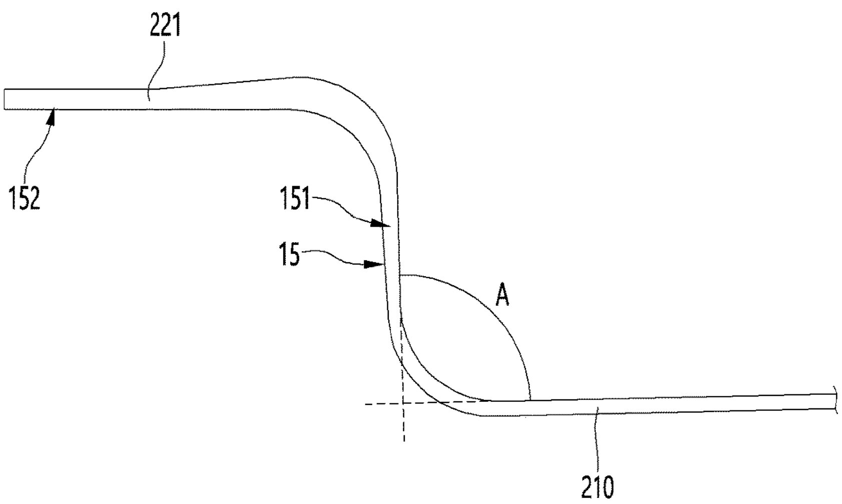
[Fig. 22]
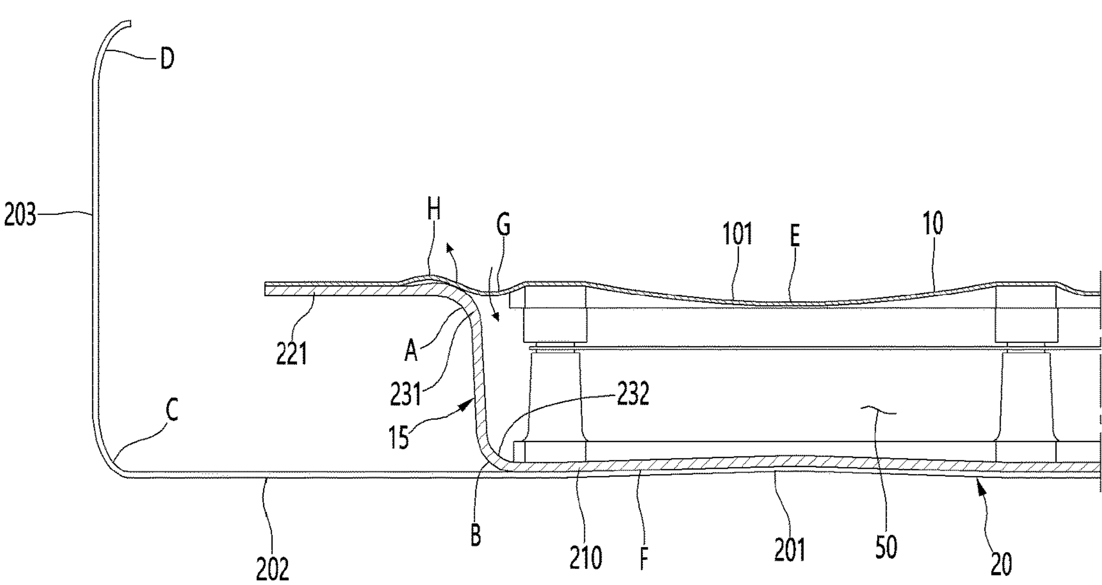
[Fig. 23]
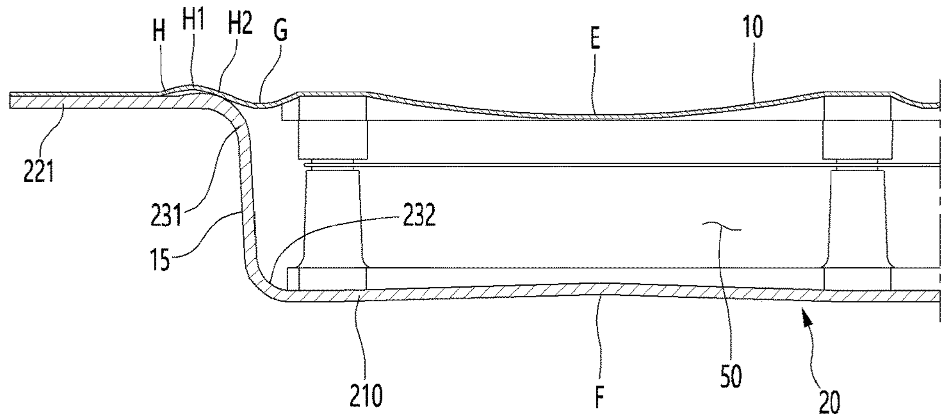

[Fig. 24]
111
211
10
210
211
[Fig. 25]
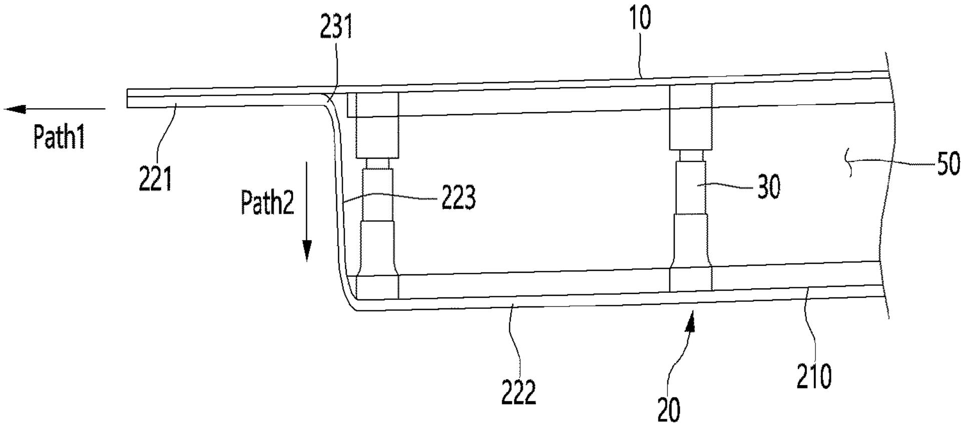

[Fig. 26]
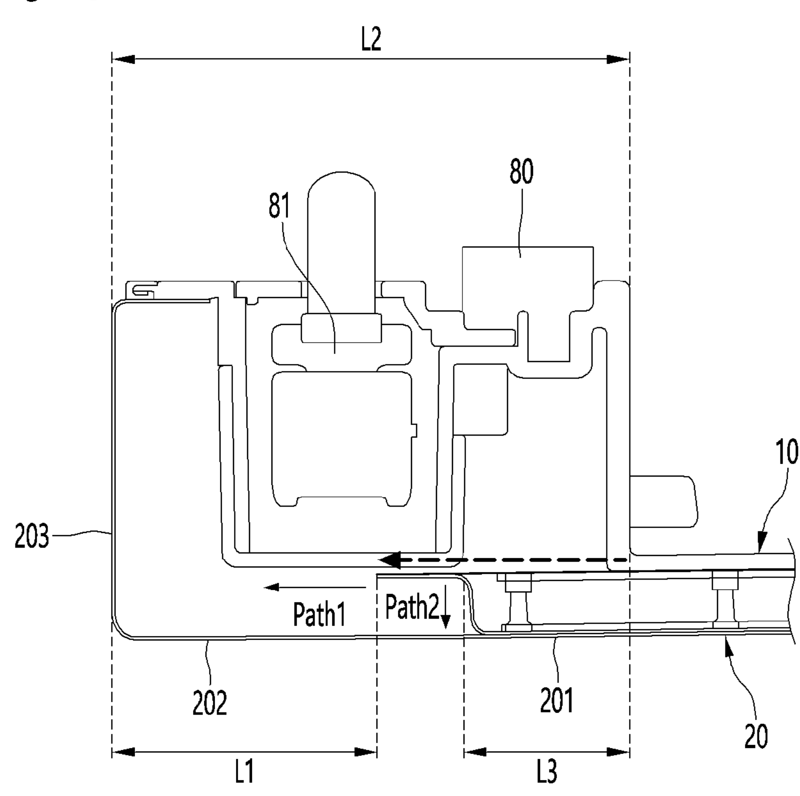
[Fig. 27]
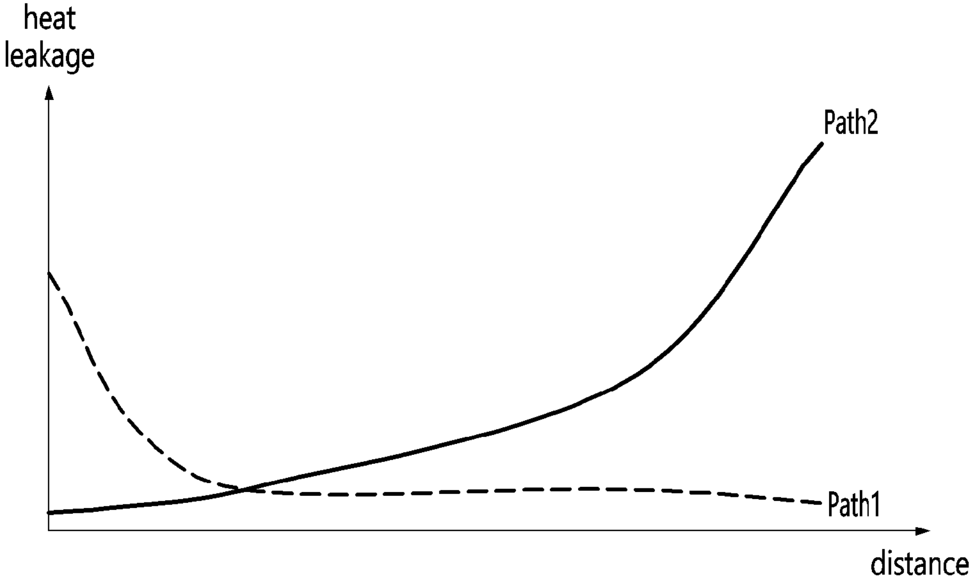

[Fig. 28]
heat leakage
Path1+Path2
distance
[Fig. 29]
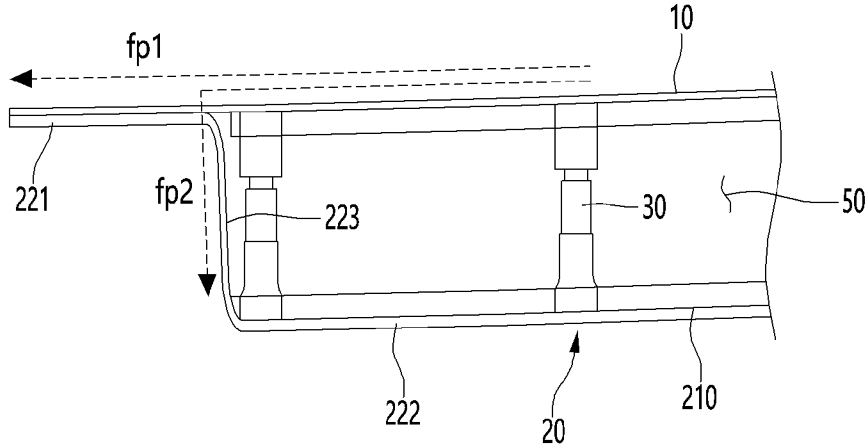

VACUUM ADIABATIC BODY

CROSS-REFERENCE TO RELATED PATENT APPLICATIONS

This application is a U.S. National Stage Application under 35 U.S.C. § 371 of PCT Application No. PCT/KR2021/015504, filed Nov. 1, 2021, which claims priority to Korean Patent Application No. 10-2020-0144747, filed Nov. 2, 2020, whose entire disclosures are hereby incorporated by reference.

TECHNICAL FIELD

The present disclosure relates to a vacuum adiabatic body.

BACKGROUND ART

A vacuum adiabatic wall may be provided to improve adiabatic performance. A device of which at least a portion of an internal space is provided in a vacuum state to achieve an adiabatic effect is referred to as a vacuum adiabatic body.

The applicant has developed a technology to obtain a vacuum adiabatic body that is capable of being used in various devices and home appliances and has disclosed Korean Application Nos. 10-2015-0109724 and 10-2015-0109722 that relate to the vacuum adiabatic body.

The vacuum adiabatic body of the cited document includes a conductive resistance sheet to reduce heat conduction through a wall of a vacuum space. In the cited document, there is no suggestion about the wall of the vacuum space in consideration of dew reduction, heat pass, cold air dispersion, temperature maintenance, and strength reinforcement.

DISCLOSURE OF INVENTION

Technical Problem

Embodiments provide a vacuum adiabatic body capable of preventing dew formation on a front portion of the vacuum adiabatic body.

Embodiments provide a vacuum adiabatic body that lengthens a conduction passage of cold air conducted along a wall of a vacuum space.

Embodiments provide a vacuum adiabatic body that disperses a cold air flow of the vacuum adiabatic body.

Embodiments provide a vacuum adiabatic body that maintains a temperature of an outer surface of the vacuum adiabatic body above a certain level.

Embodiments provide a vacuum adiabatic body having a firm structure.

Embodiments also provide technical problems and specific solutions for solving the technical problems in [Technical Solution] and [Mode for Carrying Out the Invention] in addition to the examples proposed above.

Solution to Problem

A vacuum adiabatic body according to an embodiment may include a first plate, a second plate, and a seal that seals a gap between the first plate and the second plate. Optionally, the vacuum adiabatic body according to an embodiment may include a support that maintains a vacuum space. Optionally, the vacuum adiabatic body according to an embodiment may include a heat transfer resistor that reduces an amount of heat transfer between the first plate and the second plate. Optionally, the vacuum adiabatic body may include a component coupling portion connected to at least one of the first or second plate so that a component is coupled thereto. Accordingly, the vacuum adiabatic body capable of achieving the industrial purpose may be provided.

Optionally, to reduce dew formation, a side plate may have an extension portion extending outwardly of the vacuum space. Accordingly, the cold air may be branched. Accordingly, it is possible to reduce the cold air flowing into the second plate. Accordingly, dew formation on a surface of the second plate may be reduced.

Optionally, a first straight portion and a second straight portion below the first straight portion may be provided in the height direction (y-axis) of the vacuum space. Optionally, a third curved portion may be provided between the first and second straight portions. According to this configuration, it is possible to provide the vacuum adiabatic body having a firm structure.

Optionally, the first straight portion may be the extension portion. Optionally, the first straight portion may be adjacent to the first plate side. Accordingly, it is possible to branch cold air from the first plate.

With the above configuration, it is possible to reduce dew formation of the second straight portion by the first straight portion. Accordingly, even though the second straight portion is exposed to the outside, the dew formation may be reduced.

Optionally, the first straight portion may be disposed in a direction away from the second straight portion. Optionally, the cold air of the first straight portion may be prevented from being transmitted to the second straight portion.

Optionally, the first straight portion may extend in a direction away from the second straight portion. Accordingly, the cold air may be branched away from the second straight portion.

Optionally, the first straight portion may be spaced apart from the second straight portion in a height direction of the vacuum space. Accordingly, it is possible to maintain a state in which the low-temperature space and the high-temperature space are separated from each other. Accordingly, it is possible to prevent the first and second straight portions from affecting each other.

Optionally, the second straight tube may extend in the height direction of the vacuum space. Accordingly, it is possible to induce the cold air in a direction that is away from the vacuum space.

Optionally, the first straight portion and the second straight portion may extend in opposite directions. According to this configuration, an influence of the cold air may be further reduced.

Optionally, the first straight portion may extend toward a side surface portion of the vacuum adiabatic body. Accordingly, it is possible to reduce the dew formation on a front surface of the vacuum adiabatic body.

Optionally, the first straight portion may extend in a direction away from the third straight portion. Optionally, the cold air passages of the first and third straight portions may not overlap each other.

Optionally, a length of the first straight portion may be less than a pitch between bars of the supporter. According to this configuration, it is possible to block too much cold air flow.

Optionally, the length of the first straight portion may be less than a height of the vacuum space. According to this, it is possible to prevent an excessive cold air loss.

Optionally, a first curved portion may be provided between the first and third straight portions. Optionally, a second curved portion between the second and third straight portions may be further provided. Optionally, the first, second, and third straight portions may be securely coupled to each other.

Optionally, the second straight portion may be provided in the second plate. Optionally, the second straight portion may directly provide a front portion of the vacuum adiabatic body.

Optionally, the side plate may be provided as one body with the second plate. Accordingly, production of the vacuum adiabatic body may be facilitated.

Optionally, the first plate and the side plate may be coupled to each other. Optionally, a seal in which the first plate and the side plate are sealed may be provided. Accordingly, the vacuum adiabatic body may maintain the sealed state by bonding the first plate and the side plate.

Optionally, a first straight portion and a second straight portion below the first straight portion may be provided in the height direction (y-axis) of the vacuum space. Optionally, a third straight portion may be provided between the first and second straight portions. Optionally, a first connection portion connecting the first and third straight portions to each other may be provided. Optionally, a second connection portion connecting the second and third straight lines may be provided. Optionally, the first straight portion may extend outside the vacuum space. According to such a configuration, it is possible to reduce the cold air flowing into the second plate to reduce the dew formation on the second plate.

Optionally, to reduce the cold air flowing along a wall of the vacuum space, the first straight portion may extend to another adiabatic body. Accordingly, it is possible to prevent the dew formation caused by the first straight portion.

Optionally, the first straight portion may be coupled to the first plate. Accordingly, the first straight portion may receive the cold air from the first plate.

In the vacuum adiabatic body according to another aspect, to reduce the dew formation, the side plate may provide the wall in the vacuum space. Optionally, it may have a first portion of the side plate. Optionally, it may have a second portion of the side plate extending outwardly of the vacuum space. According to an embodiment, it is possible to directly guide the cold air in a direction that is away from the second plate at a point at which the cold air is branched. Accordingly, the dew formation of the second plate may be reduced.

Optionally, bending stress may be concentrated on the curved portion. A concentrated bending stress may be stress that transmits force transmitted from any one of the two straight lines in the other direction. In one or more embodiments, A first curved portion may include at least one of a first-1 curved portion adjacent to the first straight portion or a first-2 curved portion adjacent to the third straight portion. A point h may have a curvature radius less than that of the point i. The point h may be provided to be thicker than the point i. A third straight portion may be an area to which a small load extending in the height direction of the vacuum space is applied. The thickness of the first straight portion and/or the thickness of the second straight portion may be a mean thickness of each straight portion. The point at which the number of times of external impact to be applied and/or the point at which the stress is dispersed may be thinned, and other portions may be reinforced. A movement of the base material may include a stretching action. An external impact and/or A concentrated stress may be applied to the vacuum adiabatic body.

Optionally, the first plate, the bent side plate, and/or the bent second plate may define the accommodation space. In the vacuum adiabatic body component assembly process, at least one of the support, the heat transfer resistor, or the through-component may be assembled to the plate. The curvature may be the same as or similar to that of the first portion of the first plate. In one or more embodiments, at least two of the operations in which the exhaust passage heats the vacuum adiabatic body, the exhaust passage accommodates the vacuum adiabatic body, and a pump exhausts the vacuum adiabatic body may be performed at the same time. At least one of the inner panel, the outer panel, an upper cover, a lower cover, and a latch may be additionally installed. At least one of the support or the heat transfer resistor may be placed in the vacuum space.

The first plate 10 and/or the single body 210 may be made of stainless steel as a material.

Advantageous Effects of Invention

According to the embodiment, the cold air that flows to the front surface portion of the vacuum adiabatic body may be induced to flow in the other direction, the dew formation on the front surface of the vacuum adiabatic body may be prevented.

According to the embodiment, the extension portion extending in the direction away from the wall of the vacuum space may be provided to reduce the cold air along the wall of the vacuum space and prevent the dew from being generated on the outer surface of the vacuum adiabatic body.

According to the embodiment, the conductive resistance sheet may allow the first plate to be performed, and also, induce the insufficient cold air reduction to the outside of the vacuum adiabatic body wall, thereby preventing the dew formation on a side of the second plate.

According to the embodiment, the first straight portion may be performed on another adiabatic body having the large and wide adiabatic area. Thus, it may be possible to block the cold conduction by using the wide adiabatic thickness of another adiabatic body. Accordingly, the dew formation on the front surface of the second plate may be reduced.

BRIEF DESCRIPTION OF DRAWINGS

FIG. 1 is a perspective view of a refrigerator according to an embodiment.

FIG. 2 is a view schematically illustrating a vacuum adiabatic body used in a main body and a door of the refrigerator.

FIG. 3 is a view illustrating an example of a support that maintains a vacuum space.

FIG. 4 is a view for explaining an example of the vacuum with respect to a heat transfer resistor.

FIG. 5 is a graph illustrating results obtained by observing a process of exhausting the inside of the vacuum adiabatic body with a time and pressure when the support is used.

FIG. 6 is a graph illustrating results obtained by comparing a vacuum pressure to gas conductivity.

FIG. 8 is a view for explaining another adiabatic body.

FIG. 13 is a perspective view of a second plate.

FIG. 14 is front and cross-sectional views of the second plate.

FIG. 15 is an enlarged view illustrating a corner portion of the second plate.

FIG. 16 is a view for explaining a method for manufacturing the second plate.

FIGS. 17 and 18 are views illustrate a process of manufacturing a single body according to another embodiment.

FIG. 19 is a partial cross-sectional perspective view of a single body.

FIG. 20 is a partial front view of the cross-sectional view of FIG. 19.

FIG. 21 is a partial cross-sectional view of the single body.

FIG. 22 is a reference view for explaining a curvature of each member of the vacuum adiabatic body according to an embodiment.

FIG. 23 is a cross-sectional view of a peripheral portion of the vacuum adiabatic body and illustrates a curvature radius from a portion E to a portion H in more detail.

FIG. 24 is a view illustrates that an outer cover is mounted to the first plate and the single body.

FIG. 25 is a cross-sectional view illustrating a peripheral portion of the vacuum adiabatic module.

FIG. 26 is a cross-sectional view of the vacuum adiabatic body.

FIGS. 27 and 28 are views illustrating results obtained by comparing heat leakage as a length of a straight portion increases, wherein FIG. 27 is a view illustrating the heat leakage of two paths, which are separated from each other, and FIG. 28 is a view illustrating the added heat leakage of the two paths.

FIG. 29 is a view illustrating a passage path of branched cold air.

MODE FOR THE INVENTION

Figure 7:
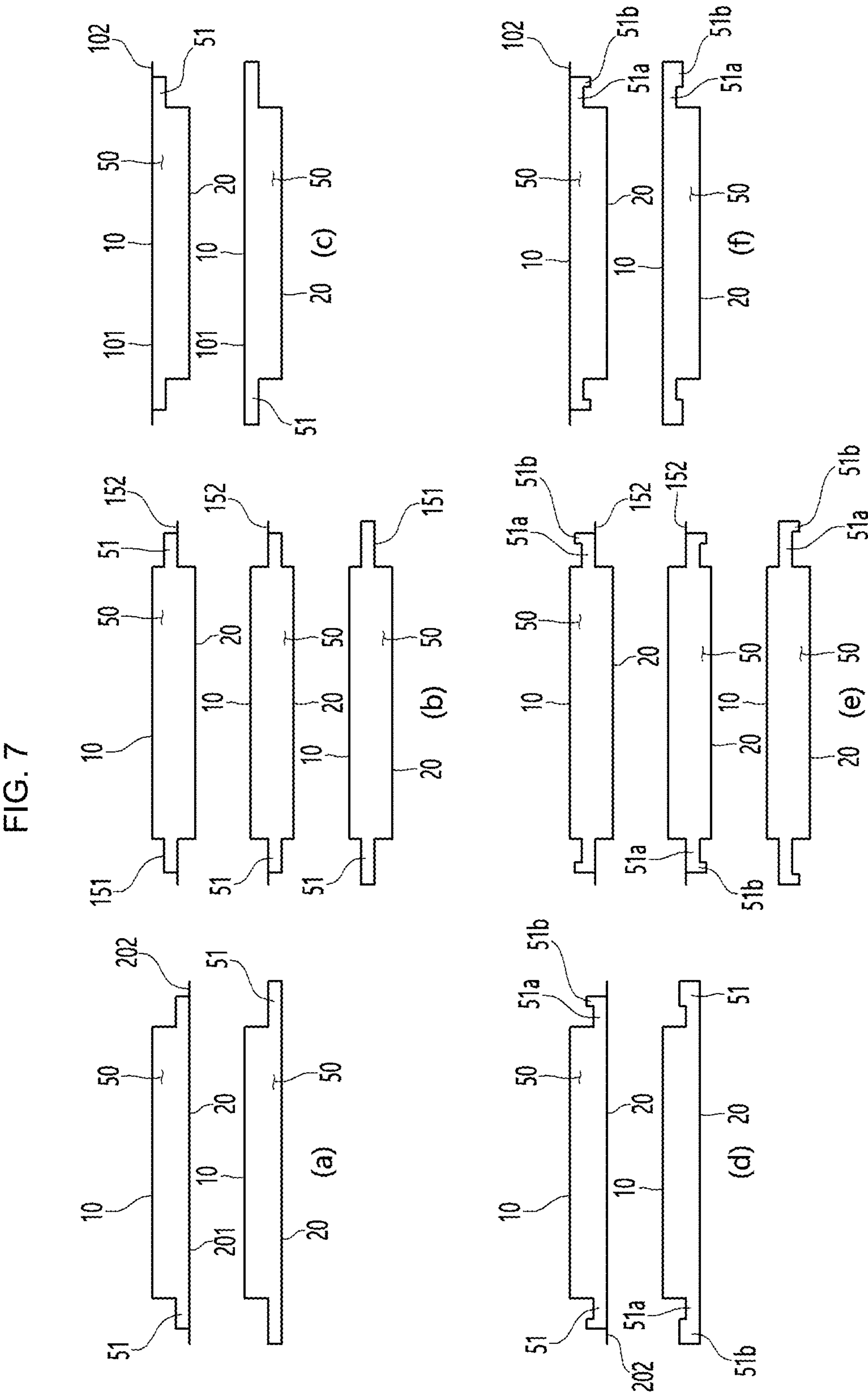
FIG. 7 is a view illustrating various examples of the vacuum space.

Hereinafter, specific embodiments will be described in detail with reference to the accompanying drawings. The invention may, however, be embodied in many different forms and should not be construed as being limited to the embodiments set forth herein, and a person of ordinary skill in the art, who understands the spirit of the present invention, may readily implement other embodiments included within the scope of the same concept by adding, changing, deleting, and adding components; rather, it will be understood that they are also included within the scope of the present invention. The present invention may have many embodiments in which the idea is implemented, and in each embodiment, any portion may be replaced with a corresponding portion or a portion having a related action according to another embodiment. The present invention may be any one of the examples presented below or a combination of two or more examples.

The present disclosure relates to a vacuum adiabatic body including a first plate; a second plate; a vacuum space defined between the first and second plates; and a seal providing the vacuum space that is in a vacuum state. The vacuum space may be a space in a vacuum state provided in an internal space between the first plate and the second plate. The seal may seal the first plate and the second plate to provide the internal space provided in the vacuum state. The vacuum adiabatic body may optionally include a side plate connecting the first plate to the second plate. In the present disclosure, the expression "plate" may mean at least one of the first and second plates or the side plate. At least a portion of the first and second plates and the side plate may be integrally provided, or at least portions may be sealed to each other. Optionally, the vacuum adiabatic body may include a support that maintains the vacuum space. The vacuum adiabatic body may selectively include a thermal insulator that reduces an amount of heat transfer between a first space provided in vicinity of the first plate and a second space provided in vicinity of the second plate or reduces an amount of heat transfer between the first plate and the second plate. Optionally, the vacuum adiabatic body may include a component coupling portion provided on at least a portion of the plate. Optionally, the vacuum adiabatic body may include another adiabatic body. Another adiabatic body may be provided to be connected to the vacuum adiabatic body. Another adiabatic body may be an adiabatic body having a degree of vacuum, which is equal to or different from a degree of vacuum of the vacuum adiabatic body. Another adiabatic body may be an adiabatic body that does not include a degree of vacuum less than that of the vacuum adiabatic body or a portion that is in a vacuum state therein. In this case, it may be advantageous to connect another object to another adiabatic body.

In the present disclosure, a direction along a wall defining the vacuum space may include a longitudinal direction of the vacuum space and a height direction of the vacuum space. The height direction of the vacuum space may be defined as any one direction among virtual lines connecting the first space to the second space to be described later while passing through the vacuum space. The longitudinal direction of the vacuum space may be defined as a direction perpendicular to the set height direction of the vacuum space. In the present disclosure, that an object A is connected to an object B means that at least a portion of the object A and at least a portion of the object B are directly connected to each other, or that at least a portion of the object A and at least a portion of the object B are connected to each other through an intermedium interposed between the objects A and B. The intermedium may be provided on at least one of the object A or the object B. The connection may include that the object A is connected to the intermedium, and the intermedium is connected to the object B. A portion of the intermedium may include a portion connected to either one of the object A and the object B. The other portion of the intermedium may include a portion connected to the other of the object A and the object B. As a modified example, the connection of the object A to the object B may include that the object A and the object B are integrally prepared in a shape connected in the above-described manner. In the present disclosure, an embodiment of the connection may be support, combine, or a seal, which will be described later. In the present disclosure, that the object A is supported by the object B means that the object A is restricted in movement by the object B in one or more of the +X, +X, +Y, −Y, +Z, and −Z axis directions. In the present invention, an embodiment of the support may be the combine or seal, which will be described later. In the present invention, that the object A is combined with the object B may define that the object A is restricted in movement by the object B in one or more of the X, Y, and Z-axis directions. In the present disclosure, an embodiment of the combining may be the sealing to be described later. In the present disclosure, that the object A is sealed to the object B may define a state in which movement of a fluid is not allowed at the portion at which the object A and the object B are connected. In the present disclosure, one or more objects, i.e., at least a portion of the object A and the object B, may be defined as including a portion of the object A, the whole of the object A, a portion of the object B, the whole of the object B, a portion of the object A and a portion of the object B, a portion of the object A and the whole of the object B, the whole of the object A and a portion of the object B, and the whole of the object A and the whole of the object B. In the present disclosure, that the plate A may be a wall defining the space A may be defined as that at least a portion of the plate A may be a wall defining at least a portion of the space A. That is, at least a portion of the plate A may be a wall forming the space A, or the plate A may be a wall forming at least a portion of the space A. In the present disclosure, a central portion of the object may be defined as a central portion among three divided portions when the object is divided into three sections based on the longitudinal direction of the object. A periphery of the object may be defined as a portion disposed at a left or right side of the central portion among the three divided portions. The periphery of the object may include a surface that is in contact with the central portion and a surface opposite thereto. The opposite side may be defined as a border or edge of the object. Examples of the object may include a vacuum adiabatic body, a plate, a heat transfer resistor, a support, a vacuum space, and various components to be introduced in the present disclosure. In the present disclosure, a degree of heat transfer resistance may indicate a degree to which an object resists heat transfer and may be defined as a value determined by a shape including a thickness of the object, a material of the object, and a processing method of the object. The degree of the heat transfer resistance may be defined as the sum of a degree of conduction resistance, a degree of radiation resistance, and a degree of convection resistance. The vacuum adiabatic body according to the present disclosure may include a heat transfer path defined between spaces having different temperatures, or a heat transfer path defined between plates having different temperatures. For example, the vacuum adiabatic body according to the present disclosure may include a heat transfer path through which cold is transferred from a low-temperature plate to a high-temperature plate. In the present disclosure, when a curved portion includes a first portion extending in a first direction and a second portion extending in a second direction different from the first direction, the curved portion may be defined as a portion that connects the first portion to the second portion (including 90 degrees).

In the present disclosure, the vacuum adiabatic body may optionally include a component coupling portion. The component coupling portion may be defined as a portion provided on the plate to which components are connected to each other. The component connected to the plate may be defined as a penetration portion disposed to pass through at least a portion of the plate and a surface component disposed to be connected to a surface of at least a portion of the plate. At least one of the penetration component or the surface component may be connected to the component coupling portion. The penetration component may be a component that defines a path through which a fluid (electricity, refrigerant, water, air, etc.) passes mainly. In the present disclosure, the fluid is defined as any kind of flowing material. The fluid includes moving solids, liquids, gases, and electricity. For example, the component may be a component that defines a path through which a refrigerant for heat exchange passes, such as a suction line heat exchanger (SLHX) or a refrigerant tube. The component may be an electric wire that supplies electricity to an apparatus. As another example, the component may be a component that defines a path through which air passes, such as a cold duct, a hot air duct, and an exhaust port. As another example, the component may be a path through which a fluid such as coolant, hot water, ice, and defrost water pass. The surface component may include at least one of a peripheral adiabatic body, a side panel, injected foam, a pre-prepared resin, a hinge, a latch, a basket, a drawer, a shelf, a light, a sensor, an evaporator, a front decor, a hotline, a heater, an exterior cover, or another adiabatic body.

As an example to which the vacuum adiabatic body is applied, the present disclosure may include an apparatus having the vacuum adiabatic body. Examples of the apparatus may include an appliance. Examples of the appliance may include home appliances including a refrigerator, a cooking appliance, a washing machine, a dishwasher, and an air conditioner, etc. As an example in which the vacuum adiabatic body is applied to the apparatus, the vacuum adiabatic body may constitute at least a portion of a body and a door of the apparatus. As an example of the door, the vacuum adiabatic body may constitute at least a portion of a general door and a door-in-door (DID) that is in direct contact with the body. Here, the door-in-door may mean a small door placed inside the general door. As another example to which the vacuum adiabatic body is applied, the present disclosure may include a wall having the vacuum adiabatic body. Examples of the wall may include a wall of a building, which includes a window.

Hereinafter, the present disclosure will be described in detail with reference to the accompanying drawings. Each of the drawings accompanying the embodiment may be different from, exaggerated, or simply indicated from an actual article, and detailed components may be indicated with simplified features. The embodiment should not be interpreted as being limited only to the size, structure, and shape presented in the drawings. In the embodiments accompanying each of the drawings, unless the descriptions conflict with each other, some configurations in the drawings of one embodiment may be applied to some configurations of the drawings in another embodiment, and some structures in one embodiment may be applied to some structures in another embodiment. In the description of the drawings for the embodiment, the same reference numerals may be assigned to different drawings as reference numerals of specific components constituting the embodiment. Components having the same reference number may perform the same function. For example, the first plate constituting the vacuum adiabatic body has a portion corresponding to the first space throughout all embodiments and is indicated by reference number 10. The first plate may have the same number for all embodiments and may have a portion corresponding to the first space, but the shape of the first plate may be different in each embodiment. Not only the first plate, but also the side plate, the second plate, and another adiabatic body may be understood as well.

FIG. 1 is a perspective view of a refrigerator according to an embodiment, and FIG. 2 is a schematic view illustrating a vacuum adiabatic body used for a body and a door of the refrigerator. Referring to FIG. 1, the refrigerator 1 includes a main body 2 provided with a cavity 9 capable of storing storage goods and a door 3 provided to open and close the main body 2. The door 3 may be rotatably or slidably disposed to open or close the cavity 9. The cavity 9 may provide at least one of a refrigerating compartment and a freezing compartment. A cold source that supplies cold to the cavity may be provided. For example, the cold source may be an evaporator 7 that evaporates the refrigerant to take heat. The evaporator 7 may be connected to a compressor 4 that compresses the refrigerant evaporated to the cold source. The evaporator 7 may be connected to a condenser 5 that condenses the compressed refrigerant to the cold source. The evaporator 7 may be connected to an expander 6 that expands the refrigerant condensed in the cold source. A fan corresponding to the evaporator and the condenser may be provided to promote heat exchange. As another example, the cold source may be a heat absorption surface of a thermoelectric element. A heat absorption sink may be connected to the heat absorption surface of the thermoelectric element. A heat sink may be connected to a heat radiation surface of the thermoelectric element. A fan corresponding to the heat absorption surface and the heat generation surface may be provided to promote heat exchange.

Referring to FIG. 2, plates 10, 15, and 20 may be walls defining the vacuum space. The plates may be walls that partition the vacuum space from an external space of the vacuum space. An example of the plates is as follows. The present disclosure may be any one of the following examples or a combination of two or more examples.

The plate may be provided as one portion or may be provided to include at least two portions connected to each other. As a first example, the plate may include at least two portions connected to each other in a direction along a wall defining the vacuum space. Any one of the two portions may include a portion (e.g., a first portion) defining the vacuum space. The first portion may be a single portion or may include at least two portions that are sealed to each other. The other one of the two portions may include a portion (e.g., a second portion) extending from the first portion of the first plate in a direction away from the vacuum space or extending in an inner direction of the vacuum space. As a second example, the plate may include at least two layers connected to each other in a thickness direction of the plate. Any one of the two layers may include a layer (e.g., the first portion) defining the vacuum space. The other one of the two layers may include a portion (e.g., the second portion) provided in an external space (e.g., a first space and a second space) of the vacuum space. In this case, the second portion may be defined as an outer cover of the plate. The other one of the two layers may include a portion (e.g., the second portion) provided in the vacuum space. In this case, the second portion may be defined as an inner cover of the plate.

The plate may include a first plate 10 and a second plate 20. One surface of the first plate (the inner surface of the first plate) provides a wall defining the vacuum space, and the other surface (the outer surface of the first plate) of the first plate A wall defining the first space may be provided. The first space may be a space provided in the vicinity of the first plate, a space defined by the apparatus, or an internal space of the apparatus. In this case, the first plate may be referred to as an inner case. When the first plate and the additional member define the internal space, the first plate and the additional member may be referred to as an inner case. The inner case may include two or more layers. In this case, one of the plurality of layers may be referred to as an inner panel. One surface of the second plate (the inner surface of the second plate) provides a wall defining the vacuum space, and the other surface (the outer surface of the first plate) of the second plate A wall defining the second space may be provided. The second space may be a space provided in vicinity of the second plate, another space defined by the apparatus, or an external space of the apparatus. In this case, the second plate may be referred to as an outer case. When the second plate and the additional member define the external space, the second plate and the additional member may be referred to as an outer case. The outer case may include two or more layers. In this case, one of the plurality of layers may be referred to as an outer panel. The second space may be a space having a temperature higher than that of the first space or a space having a temperature lower than that of the first space. Optionally, the plate may include a side plate 15. In FIG. 2, the side plate may also perform a function of a conductive resistance sheet 60 to be described later, according to the disposition of the side plate. The side plate may include a portion extending in a height direction of a space defined between the first plate and the second plate or a portion extending in a height direction of the vacuum space. One surface of the side plate may provide a wall defining the vacuum space, and the other surface of the side plate may provide a wall defining an external space of the vacuum space. The external space of the vacuum space may be at least one of the first space or the second space or a space in which another adiabatic body to be described later is disposed. The side plate may be integrally provided by extending at least one of the first plate or the second plate or a separate component connected to at least one of the first plate or the second plate.

The plate may optionally include a curved portion. In the present disclosure, the plate including a curved portion may be referred to as a bent plate. The curved portion may include at least one of the first plate, the second plate, the side plate, between the first plate and the second plate, between the first plate and the side plate, or between the second plate and the side plate. The plate may include at least one of a first curved portion or a second curved portion, an example of which is as follows. First, the side plate may include the first curved portion. A portion of the first curved portion may include a portion connected to the first plate. Another portion of the first curved portion may include a portion connected to the second curved portion. In this case, a curvature radius of each of the first curved portion and the second curved portion may be large. The other portion of the first curved portion may be connected to an additional straight portion or an additional curved portion, which are provided between the first curved portion and the second curved portion. In this case, a curvature radius of each of the first curved portion and the second curved portion may be small. Second, the side plate may include the second curved portion. A portion of the second curved portion may include a portion connected to the second plate. The other portion of the second curved portion may include a portion connected to the first curved portion. In this case, a curvature radius of each of the first curved portion and the second curved portion may be large. The other portion of the second curved portion may be connected to an additional straight portion or an additional curved portion, which are provided between the first curved portion and the second curved portion. In this case, a curvature radius of each of the first curved portion and the second curved portion may be small. Here, the straight portion may be defined as a portion having a curvature radius greater than that of the curved portion. The straight portion may be understood as a portion having a perfect plane or a curvature radius greater than that of the curved portion. Third, the first plate may include the first curved portion. A portion of the first curved portion may include a portion connected to the side plate. A portion connected to the side plate may be provided at a position that is away from the second plate at a portion at which the first plate extends in the longitudinal direction of the vacuum space. Fourth, the second plate may include the second curved portion. A portion of the second curved portion may include a portion connected to the side plate. A portion connected to the side plate may be provided at a position that is away from the first plate at a portion at which the second plate extends in the longitudinal direction of the vacuum space. The present disclosure may include a combination of any one of the first and second examples described above and any one of the third and fourth examples described above.

In the present disclosure, the vacuum space 50 may be defined as a third space. The vacuum space may be a space in which a vacuum pressure is maintained. In the present disclosure, the expression that a vacuum degree of A is higher than that of B means that a vacuum pressure of A is lower than that of B.

In the present disclosure, the seal 61 may be a portion provided between the first plate and the second plate. Examples of sealing are as follows. The present disclosure may be any one of the following examples or a combination of two or more examples. The sealing may include fusion welding for coupling the plurality of objects by melting at least a portion of the plurality of objects. For example, the first plate and the second plate may be welded by laser welding in a state in which a melting bond such as a filler metal is not interposed therebetween, a portion of the first and second plates and a portion of the component coupling portion may be welded by high-frequency brazing or the like, or a plurality of objects may be welded by a melting bond that generates heat. The sealing may include pressure welding for coupling the plurality of objects by a mechanical pressure applied to at least a portion of the plurality of objects. For example, as a component connected to the component coupling portion, an object made of a material having a degree of deformation resistance less than that of the plate may be pressure-welded by a method such as pinch-off.

A machine room 8 may be optionally provided outside the vacuum adiabatic body. The machine room may be defined as a space in which components connected to the cold source are accommodated. Optionally, the vacuum adiabatic body may include a port 40. The port may be provided at any one side of the vacuum adiabatic body to discharge air of the vacuum space 50. Optionally, the vacuum adiabatic body may include a conduit 64 passing through the vacuum space 50 to install components connected to the first space and the second space.

FIG. 3 is a view illustrating an example of a support that maintains the vacuum space. An example of the support is as follows. The present disclosure may be any one of the following examples or a combination of two or more examples.

The supports 30, 31, 33, and 35 may be provided to support at least a portion of the plate and a heat transfer resistor to be described later, thereby reducing deformation of at least some of the vacuum space 50, the plate, and the heat transfer resistor to be described later due to external force. The external force may include at least one of a vacuum pressure or external force excluding the vacuum pressure. When the deformation occurs in a direction in which a height of the vacuum space is lower, the support may reduce an increase in at least one of radiant heat conduction, gas heat conduction, surface heat conduction, or support heat conduction, which will be described later. The support may be an object provided to maintain a gap between the first plate and the second plate or an object provided to support the heat transfer resistor. The support may have a degree of deformation resistance greater than that of the plate or be provided to a portion having weak degree of deformation resistance among portions constituting the vacuum adiabatic body, the apparatus having the vacuum adiabatic body, and the wall having the vacuum adiabatic body. According to an embodiment, a degree of deformation resistance represents a degree to which an object resists deformation due to external force applied to the object and is a value determined by a shape including a thickness of the object, a material of the object, a processing method of the object, and the like. Examples of the portions having the weak degree of deformation resistance include the vicinity of the curved portion defined by the plate, at least a portion of the curved portion, the vicinity of an opening defined in the body of the apparatus, which is provided by the plate, or at least a portion of the opening. The support may be disposed to surround at least a portion of the curved portion or the opening or may be provided to correspond to the shape of the curved portion or the opening. However, it is not excluded that the support is provided in other portions. The opening may be understood as a portion of the apparatus including the body and the door capable of opening or closing the opening defined in the body.

An example in which the support is provided to support the plate is as follows. First, at least a portion of the support may be provided in a space defined inside the plate. The plate may include a portion including a plurality of layers, and the support may be provided between the plurality of layers. Optionally, the support may be provided to be connected to at least a portion of the plurality of layers or be provided to support at least a portion of the plurality of layers. Second, at least a portion of the support may be provided to be connected to a surface defined on the outside of the plate. The support may be provided in the vacuum space or an external space of the vacuum space. For example, the plate may include a plurality of layers, and the support may be provided as any one of the plurality of layers. Optionally, the support may be provided to support the other one of the plurality of layers. For example, the plate may include a plurality of portions extending in the longitudinal direction, and the support may be provided as any one of the plurality of portions. Optionally, the support may be provided to support the other one of the plurality of parts. As further another example, the support may be provided in the vacuum space or the external space of the vacuum space as a separate component, which is distinguished from the plate. Optionally, the support may be provided to support at least a portion of a surface defined on the outside of the plate. Optionally, the support may be provided to support one surface of the first plate and one surface of the second plate, and one surface of the first plate and one surface of the second plate may be provided to face each other. Third, the support may be provided to be integrated with the plate. An example in which the support is provided to support the heat transfer resistor may be understood instead of the example in which the support is provided to support the plate. A duplicated description will be omitted.

An example of the support in which heat transfer through the support is designed to be reduced is as follows. First, at least a portion of the components disposed in the vicinity of the support may be provided so as not to be in contact with the support or provided in an empty space provided by the support. Examples of the components include a tube or component connected to the heat transfer resistor to be described later, an exhaust port, a getter port, a tube or component passing through the vacuum space, or a tube or component of which at least a portion is disposed in the vacuum space. Examples of the empty space may include an empty space provided in the support, an empty space provided between the plurality of supports, and an empty space provided between the support and a separate component that is distinguished from the support. Optionally, at least a portion of the component may be disposed in a through-hole defined in the support, be disposed between the plurality of bars, be disposed between the plurality of connection plates, or be disposed between the plurality of support plates. Optionally, at least a portion of the component may be disposed in a spaced space between the plurality bars, be disposed in a spaced space between the plurality of connection plates, or be disposed in a spaced space between the plurality of support plates. Second, the adiabatic body may be provided on at least a portion of the support or in the vicinity of at least a portion of the support. The adiabatic body may be provided to be in contact with the support or provided so as not to be in contact with the support. The adiabatic body may be provided at a portion in which the support and the plate are in contact with each other. The adiabatic body may be provided on at least a portion of one surface and the other surface of the support or be provided to cover at least a portion of one surface and the other surface of the support. The adiabatic body may be provided on at least a portion of a periphery of one surface and a periphery of the other surface of the support or be provided to cover at least a portion of a periphery of one surface and a periphery of the other surface of the support. The support may include a plurality of bars, and the adiabatic body may be disposed on an area from a point at which any one of the plurality of bars is disposed to a midpoint between the one bar and the surrounding bars. Third, when cold is transferred through the support, a heat source may be disposed at a position at which the heat adiabatic body described in the second example is disposed. When a temperature of the first space is lower than a temperature of the second space, the heat source may be disposed on the second plate or in the vicinity of the second plate. When heat is transmitted through the support, a cold source may be disposed at a position at which the heat adiabatic body described in the second example is disposed. When a temperature of the first space is higher than a temperature of the second space, the cold source may be disposed on the second plate or in the vicinity of the second plate. As fourth example, the support may include a portion having heat transfer resistance higher than a metal or a portion having heat transfer resistance higher than the plate. The support may include a portion having heat transfer resistance less than that of another adiabatic body. The support may include at least one of a non-metal material, PPS, and glass fiber (GF), low outgassing PC, PPS, or LCP. This is done for a reason in which high compressive strength, low outgassing, and a water absorption rate, low thermal conductivity, high compressive strength at a high temperature, and excellent workability are being capable of obtained.

Examples of the support may be the bars 30 and 31, the connection plate 35, the support plate 35, a porous material 33, and a filler 33. In this embodiment, the support may include any one of the above examples, or an example in which at least two examples are combined. As first example, the support may include bars 30 and 31. The bar may include a portion extending in a direction in which the first plate and the second plate are connected to each other to support a gap between the first plate and the second plate. The bar may include a portion extending in a height direction of the vacuum space and a portion extending in a direction that is substantially perpendicular to the direction in which the plate extends. The bar may be provided to support only one of the first plate and the second plate or may be provided both the first plate and the second plate. For example, one surface of the bar may be provided to support a portion of the plate, and the other surface of the bar may be provided so as not to be in contact with the other portion of the plate. As another example, one surface of the bar may be provided to support at least a portion of the plate, and the other surface of the bar may be provided to support the other portion of the plate. The support may include a bar having an empty space therein or a plurality of bars, and an empty space are provided between the plurality of bars. In addition, the support may include a bar, and the bar may be disposed to provide an empty space between the bar and a separate component that is distinguished from the bar. The support may selectively include a connection plate 35 including a portion connected to the bar or a portion connecting the plurality of bars to each other. The connection plate may include a portion extending in the longitudinal direction of the vacuum space or a portion extending in the direction in which the plate extends. An XZ-plane cross-sectional area of the connection plate may be greater than an XZ-plane cross-sectional area of the bar. The connection plate may be provided on at least one of one surface and the other surface of the bar or may be provided between one surface and the other surface of the bar. At least one of one surface and the other surface of the bar may be a surface on which the bar supports the plate. The shape of the connection plate is not limited. The support may include a connection plate having an empty space therein or a plurality of connection plates, and an empty space are provided between the plurality of connection plates. In addition, the support may include a connection plate, and the connection plate may be disposed to provide an empty space between the connection plate and a separate component that is distinguished from the connection plate. As a second example, the support may include a support plate 35. The support plate may include a portion extending in the longitudinal direction of the vacuum space or a portion extending in the direction in which the plate extends. The support plate may be provided to support only one of the first plate and the second plate or may be provided both the first plate and the second plate. For example, one surface of the support plate may be provided to support a portion of the plate, and the other surface of the support plate may be provided so as not to be in contact with the other portion of the plate. As another example, one surface of the support plate may be provided to support at least a portion of the plate, and the other surface of the support plate may be provided to support the other portion of the plate. A cross-sectional shape of the support plate is not limited. The support may include a support plate having an empty space therein or a plurality of support plates, and an empty space are provided between the plurality of support plates. In addition, the support may include a support plate, and the support plate may be disposed to provide an empty space between the support plate and a separate component that is distinguished from the support plate. As a third example, the support may include a porous material 33 or a filler 33. The inside of the vacuum space may be supported by the porous material or the filler. The inside of the vacuum space may be completely filled by the porous material or the filler. The support may include a plurality of porous materials or a plurality of fillers, and the plurality of porous materials or the plurality of fillers may be disposed to be in contact with each other. When an empty space is provided inside the porous material, provided between the plurality of porous materials, or provided between the porous material and a separate component that is distinguished from the porous material, the porous material may be understood as including any one of the aforementioned bar, connection plate, and support plate. When an empty space is provided inside the filler, provided between the plurality of fillers, or provided between the filler and a separate component that is distinguished from the filler, the filler may be understood as including any one of the aforementioned bar, connection plate, and support plate. The support according to the present disclosure may include any one of the above examples or an example in which two or more examples are combined.

Referring to FIG. 3*a*, as an embodiment, the support may include a bar 31 and a connection plate and support plate 35. The connection plate and the supporting plate may be designed separately. Referring to FIG. 3*b*, as an embodiment, the support may include a bar 31, a connection plate and support plate 35, and a porous material 33 filled in the vacuum space. The porous material 33 may have emissivity greater than that of stainless steel, which is a material of the plate, but since the vacuum space is filled, resistance efficiency of radiant heat transfer is high. The porous material may also function as a heat transfer resistor to be described later. More preferably, the porous material may perform a function of a radiation resistance sheet to be described later. Referring to FIG. 3*c*, as an embodiment, the support may include a porous material 33 or a filler 33. The porous material 33 and the filler may be provided in a compressed state to maintain a gap between the vacuum space. The film 34 may be provided in a state in which a hole is punched as, for example, a PE material. The porous material 33 or the filler may perform both a function of the heat transfer resistor and a function of the support, which will be described later. More preferably, the porous material may perform both a function of the radiation resistance sheet and a function of the support to be described later.

FIG. 4 is a view for explaining an example of the vacuum adiabatic body based on heat transfer resistors 32, 33, 60, and 63 (e.g., thermal insulator and a heat transfer resistance body). The vacuum adiabatic body according to the present disclosure may optionally include a heat transfer resistor. An example of the heat transfer resistor is as follows. The present disclosure may be any one of the following examples or a combination of two or more examples.

The heat transfer resistors 32, 33, 60, and 63 may be objects that reduce an amount of heat transfer between the first space and the second space or objects that reduce an amount of heat transfer between the first plate and the second plate. The heat transfer resistor may be disposed on a heat transfer path defined between the first space and the second space or be disposed on a heat transfer path formed between the first plate and the second plate. The heat transfer resistor may include a portion extending in a direction along a wall defining the vacuum space or a portion extending in a direction in which the plate extends. Optionally, the heat transfer resistor may include a portion extending from the plate in a direction away from the vacuum space. The heat transfer resistor may be provided on at least a portion of the periphery of the first plate or the periphery of the second plate or be provided on at least a portion of an edge of the first plate or an edge of the second plate. The heat transfer resistor may be provided at a portion, in which the through-hole is defined, or provided as a tube connected to the through-hole. A separate tube or a separate component that is distinguished from the tube may be disposed inside the tube. The heat transfer resistor may include a portion having heat transfer resistance greater than that of the plate. In this case, adiabatic performance of the vacuum adiabatic body may be further improved. A shield 62 may be provided on the outside of the heat transfer resistor to be insulated. The inside of the heat transfer resistor may be insulated by the vacuum space. The shield may be provided as a porous material or a filler that is in contact with the inside of the heat transfer resistor. The shield may be an adiabatic structure that is exemplified by a separate gasket placed outside the inside of the heat transfer resistor. The heat transfer resistor may be a wall defining the third space.

An example in which the heat transfer resistor is connected to the plate may be understood as replacing the support with the heat transfer resistor in an example in which the support is provided to support the plate. A duplicate description will be omitted. The example in which the heat transfer resistor is connected to the support may be understood as replacing the plate with the support in the example in which the heat transfer resistor is connected to the plate. A duplicate description will be omitted. The example of reducing heat transfer via the heat transfer body may be applied as a substitute the example of reducing the heat transfer via the support, and thus, the same explanation will be omitted.

In the present disclosure, the heat transfer resistor may be one of a radiation resistance sheet 32, a porous material 33, a filler 33, and a conductive resistance sheet. In the present disclosure, the heat transfer resistor may include a combination of at least two of the radiation resistance sheet 32, the porous material 33, the filler 33, and the conductive resistance sheet. As a first example, the heat transfer resistor may include a radiation resistance sheet 32. The radiation resistance sheet may include a portion having heat transfer resistance greater than that of the plate, and the heat transfer resistance may be a degree of resistance to heat transfer by radiation. The support may perform a function of the radiation resistance sheet together. A conductive resistance sheet to be described later may perform the function of the radiation resistance sheet together. As a second example, the heat transfer resistor may include conduction resistance sheets 60 and 63. The conductive resistance sheet may include a portion having heat transfer resistance greater than that of the plate, and the heat transfer resistance may be a degree of resistance to heat transfer by conduction. For example, the conductive resistance sheet may have a thickness less than that of at least a portion of the plate. As another example, the conductive resistance sheet may include one end and the other end, and a length of the conductive resistance sheet may be longer than a straight distance connecting one end of the conductive resistance sheet to the other end of the conductive resistance sheet. As another example, the conductive resistance sheet may include a material having resistance to heat transfer greater than that of the plate by conduction. As another example, the heat transfer resistor may include a portion having a curvature radius less than that of the plate.

Referring to FIG. 4*a*, for example, a conductive resistance sheet may be provided on a side plate connecting the first plate to the second plate. Referring to FIG. 4*b*, for example, a conductive resistance sheet 60 may be provided on at least a portion of the first plate and the second plate. A connection frame 70 may be further provided outside the conductive resistance sheet. The connection frame may be a portion from which the first plate or the second plate extends or a portion from which the side plate extends. Optionally, the connection frame 70 may include a portion at which a component for sealing the door and the body and a component disposed outside the vacuum space such as the exhaust port and the getter port, which are required for the exhaust process, are connected to each other. Referring to FIG. 4*c*, for example, a conductive resistance sheet may be provided on a side plate connecting the first plate to the second plate. The conductive resistance sheet may be installed in a through-hole passing through the vacuum space. The conduit 64 may be provided separately outside the conductive resistance sheet. The conductive resistance sheet may be provided in a pleated shape. Through this, the heat transfer path may be lengthened, and deformation due to a pressure difference may be prevented. A separate shielding member for insulating the conductive resistance sheet 63 may also be provided. The conductive resistance sheet may include a portion having a degree of deformation resistance less than that of at least one of the plate, the radiation resistance sheet, or the support. The radiation resistance sheet may include a portion having a degree of deformation resistance less than that of at least one of the plate or the support. The plate may include a portion having a degree of deformation resistance less than that of the support. The conductive resistance sheet may include a portion having conductive heat transfer resistance greater than that of at least one of the plate, the radiation resistance sheet, or the support. The radiation resistance sheet may include a portion having radiation heat transfer resistance greater than that of at least one of the plate, the conductive resistance sheet, or the support. The support may include a portion having heat transfer resistance greater than that of the plate. For example, at least one of the plate, the conductive resistance sheet, or the connection frame may include stainless steel material, the radiation resistance sheet may include aluminum, and the support may include a resin material.

FIG. 5 is a graph for observing a process of exhausting the inside of the vacuum adiabatic body with a time and pressure when the support is used. An example of a vacuum adiabatic body vacuum exhaust process vacuum is as follows. The present disclosure may be any one of the following examples or a combination of two or more examples.

While the exhaust process is being performed, an outgassing process, which is a process in which a gas of the vacuum space is discharged, or a potential gas remaining in the components of the vacuum adiabatic body is discharged, may be performed. As an example of the outgassing process, the exhaust process may include at least one of heating or drying the vacuum adiabatic body, providing a vacuum pressure to the vacuum adiabatic body, or providing a getter to the vacuum adiabatic body. In this case, it is possible to promote the vaporization and exhaust of the potential gas remaining in the component provided in the vacuum space. The exhaust process may include a process of cooling the vacuum adiabatic body. The cooling process may be performed after the process of heating or drying the vacuum adiabatic body is performed. The process of heating or drying the vacuum adiabatic body process of providing the vacuum pressure to the vacuum adiabatic body may be performed together. The process of heating or drying the vacuum adiabatic body and the process of providing the getter to the vacuum adiabatic body may be performed together. After the process of heating or drying the vacuum adiabatic body is performed, the process of cooling the vacuum adiabatic body may be performed. The process of providing the vacuum pressure to the vacuum adiabatic body and the process of providing the getter to the vacuum adiabatic body may be performed so as not to overlap each other. For example, after the process of providing the vacuum pressure to the vacuum adiabatic body is performed, the process of providing the getter to the vacuum adiabatic body may be performed. When the vacuum pressure is provided to the vacuum adiabatic body, a pressure of the vacuum space may drop to a certain level and then no longer drop. Here, after stopping the process of providing the vacuum pressure to the vacuum adiabatic body, the getter may be input. As an example of stopping the process of providing the vacuum pressure to the vacuum adiabatic body, an operation of a vacuum pump connected to the vacuum space may be stopped. When inputting the getter, the process of heating or drying the vacuum adiabatic body may be performed together. Through this, the outgassing may be promoted. As another example, after the process of providing the getter to the vacuum adiabatic body is performed, the process of providing the vacuum pressure to the vacuum adiabatic body may be performed.

The time during which the vacuum adiabatic body vacuum exhaust process is performed may be referred to as a vacuum exhaust time. The vacuum exhaust time includes at least one of a time Δ1 during which the process of heating or drying the vacuum adiabatic body is performed, a time Δt2 during which the process of maintaining the getter in the vacuum adiabatic body is performed, of a time Δt3 during which the process of cooling the vacuum adiabatic body is performed. Examples of times Δt1, Δt2, and Δt3 are as follows. The present disclosure may be any one of the following examples or a combination of two or more examples. In the vacuum adiabatic body vacuum exhaust process, the time Δt1 may be a time t1*a* or more and a time t1*b* or less. As a first example, the time t1*a* may be greater than or equal to about 0.2 hr and less than or equal to about 0.5 hr. The time t1*b* may be greater than or equal to about 1 hr and less than or equal to about 24.0 hr. The time Δt1 may be about 0.3 hr or more and about 12.0 hr or less. The time Δt1 may be about 0.4 hr or more and about 8.0 hr or less. The time Δt1 may be about 0.5 hr or more and about 4.0 hr or less. In this case, even if the Δt1 is kept as short as possible, the sufficient outgassing may be applied to the vacuum adiabatic body. For example, this case may include a case in which a component of the vacuum adiabatic body, which is exposed to the vacuum space, among the components of the vacuum adiabatic body, has an outgassing rate (%) less than that of any one of the component of the vacuum adiabatic body, which is exposed to the external space of the vacuum space. Specifically, the component exposed to the vacuum space may include a portion having a outgassing rate less than that of a thermoplastic polymer. More specifically, the support or the radiation resistance sheet may be disposed in the vacuum space, and the outgassing rate of the support may be less than that of the thermoplastic plastic. As another example, this case may include a case in which a component of the vacuum adiabatic body, which is exposed to the vacuum space, among the components of the vacuum adiabatic body, has a max operating temperature (° C.) greater than that of any one of the component of the vacuum adiabatic body, which is exposed to the external space of the vacuum space. In this case, the vacuum adiabatic body may be heated to a higher temperature to increase in outgassing rate. For example, the component exposed to the vacuum space may include a portion having an operating temperature greater than that of the thermoplastic polymer. As a more specific example, the support or the radiation resistance sheet may be disposed in the vacuum space, and a use temperature of the support may be higher than that of the thermoplastic plastic. As another example, among the components of the vacuum adiabatic body, the component exposed to the vacuum space may contain more metallic portion than a non-metallic portion. That is, a mass of the metallic portion may be greater than a mass of the non-metallic portion, a volume of the metallic portion may be greater than a volume of the non-metallic portion, or an area of the metallic portion exposed to the vacuum space may be greater than an area exposed to the non-metallic portion of the vacuum space. When the components exposed to the vacuum space are provided in plurality, the sum of the volume of the metal material included in the first component and the volume of the metal material included in the second component may be greater than that of the volume of the non-metal material included in the first component and the volume of the non-metal material included in the second component. When the components exposed to the vacuum space are provided in plurality, the sum of the mass of the metal material included in the first component and the mass of the metal material included in the second component may be greater than that of the mass of the nonmetal material included in the first component and the mass of the non-metal material included in the second component. When the components exposed to the vacuum space are provided in plurality, the sum of the area of the metal material, which is exposed to the vacuum space and included in the first component, and an area of the metal material, which is exposed to the vacuum space and included in the second component, may be greater than that of the area of the non-metal material, which is exposed to the vacuum space and included in the first component, and an area of the non-metal material, which is exposed to the vacuum space and included in the second component. As a second example, the time t1$a$ may be greater than or equal to about 0.5 hr and less than or equal to about 1 hr. The time t1$b$ may be greater than or equal to about 24.0 hr and less than or equal to about 65 hr. The time Δt1 may be about 1.0 hr or more and about 48.0 hr or less. The time Δt1 may be about 2 hr or more and about 24.0 hr or less. The time Δt1 may be about 3 hr or more and about 12.0 hr or less. In this case, it may be the vacuum adiabatic body that needs to maintain the Δt1 as long as possible. In this case, a case opposite to the examples described in the first example or a case in which the component exposed to the vacuum space is made of a thermoplastic material may be an example. A duplicated description will be omitted. In the vacuum adiabatic body vacuum exhaust process, the time Δt1 may be a time t1$a$ or more and a time t1$b$ or less. The time t2$a$ may be greater than or equal to about 0.1 hr and less than or equal to about 0.3 hr. The time t2$b$ may be greater than or equal to about 1 hr and less than or equal to about 5.0 hr. The time Δt2 may be about 0.2 hr or more and about 3.0 hr or less. The time Δt2 may be about 0.3 hr or more and about 2.0 hr or less. The time Δt2 may be about 0.5 hr or more and about 1.5 hr or less. In this case, even if the time Δt2 is kept as short as possible, the sufficient outgassing through the getter may be applied to the vacuum adiabatic body. In the vacuum adiabatic body vacuum exhaust process, the time Δt3 may be a time t3$a$ or more and a time t3$b$ or less. The time t2$a$ may be greater than or equal to about 0.2 hr and less than or equal to about 0.8 hr. The time t2$b$ may be greater than or equal to about 1 hr and less than or equal to about 65.0 hr. The tine Δt3 may be about 0.2 hr or more and about 48.0 hr or less. The time Δt3 may be about 0.3 hr or more and about 24.0 hr or less. The time Δt3 may be about 0.4 hr or more and about 12.0 hr or less. The time Δt3 may be about 0.5 hr or more and about 5.0 hr or less. After the heating or drying process is performed during the exhaust process, the cooling process may be performed. For example, when the heating or drying process is performed for a long time, the time Δt3 may be long. The vacuum adiabatic body according to the present disclosure may be manufactured so that the time Δt1 is greater than the time Δt2, the time Δt1 is less than or equal to the time Δt3, or the time Δt3 is greater than the time Δt2. The following relational expression is satisfied: Δt2<Δt1<Δt3. The vacuum adiabatic body according to an embodiment may be manufactured so that the relational expression: Δt1+Δt2+Δt3 may be greater than or equal to about 0.3 hr and less than or equal to about 70 hr, be greater than or equal to about 1 hr and less than or equal to about 65 hr, or be greater than or equal to about 2 hr and less than or equal to about 24 hr. The relational expression: Δt1+Δt2+Δt3 may be manufactured to be greater than or equal to about 3 hr and less than or equal to about 6 hr.

An example of the vacuum pressure condition during the exhaust process is as follows. The present disclosure may be any one of the following examples or a combination of two or more examples. A minimum value of the vacuum pressure in the vacuum space during the exhaust process may be greater than about 1.8E−6 Torr. The minimum value of the vacuum pressure may be greater than about 1.8E−6 Torr and less than or equal to about 1.0E−4 Torr, be greater than about 0.5E−6 Torr and less than or equal to about 1.0E−4 Torr, or be greater than about 0.5E−6 Torr and less than or equal to about 0.5E−5 Torr. The minimum value of the vacuum pressure may be greater than about 0.5E−6 Torr and less than about 1.0E−5 Torr. As such, the limitation in which the minimum value of the vacuum pressure provided during the exhaust process is because, even if the pressure is reduced through the vacuum pump during the exhaust process, the decrease in vacuum pressure is slowed below a certain level. As an embodiment, after the exhaust process is performed, the vacuum pressure of the vacuum space may be maintained at a pressure greater than or equal to about 1.0E−5 Torr and less than or equal to about 5.0E−1 Torr. The maintained vacuum pressure may be greater than or equal to about 1.0E−5 Torr and less than or equal to about 1.0E−1 Torr, be greater than or equal to about 1.0E−5 Torr and less than or equal to about 1.0E−2 Torr, be greater than or equal to about 1.0E−4 Torr and less than or equal to about 1.0E−2 Torr, or be greater than or equal to about 1.0E−5 Torr and less than or equal to about 1.0E−3 Torr. As a result of predicting the change in vacuum pressure with an accelerated experiment of two example products, one product may be provided so that the vacuum pressure is maintained below about 1.0E−04 Torr even after about 16.3 years, and the other product may be provided so that the vacuum pressure is maintained below about 1.0E−04 Torr even after about 17.8 years. As described above, the vacuum pressure of the vacuum adiabatic body may be used industrially only when it is maintained below a predetermined level even if there is a change over time.

FIG. 5$a$ is a graph of an elapsing time and pressure in the exhaust process according to an example, and FIG. 5$b$ is a view explaining results of a vacuum maintenance test in the acceleration experiment of the vacuum adiabatic body of the refrigerator having an internal volume of about 128 liters. Referring to FIG. 5$b$, it is seen that the vacuum pressure gradually increases according to the aging. For example, it is confirmed that the vacuum pressure is about 6.7E−04 Torr after about 4.7 years, about 1.7E−03 Torr after about 10 years, and about 1.0E−02 Torr after about 59 years. According to these experimental results, it is confirmed that the vacuum adiabatic body according to the embodiment is sufficiently industrially applicable.

FIG. 6 is a graph illustrating results obtained by comparing the vacuum pressure with gas conductivity. Referring to FIG. 6, gas conductivity with respect to the vacuum pressure depending on a size of the gap in the vacuum space 50 was represented as a graph of effective heat transfer coefficient (eK). The effective heat transfer coefficient (eK) was measured when the gap in the vacuum space 50 has three values of about 3 mm, about 4.5 mm, and about 9 mm. The gap in the vacuum space 50 is defined as follows. When the radiation resistance sheet 32 exists inside surface vacuum space 50, the gap is a distance between the radiation resistance sheet 32 and the plate adjacent thereto. When the radiation resistance sheet 32 does not exist inside surface vacuum space 50, the gap is a distance between the first and second plates. It was seen that, since the size of the gap is small at a point corresponding to a typical effective heat transfer coefficient of about 0.0196 W/mK, which is provided to an adiabatic material formed by foaming polyurethane, the vacuum pressure is about 5.0E−1 Torr even when the size of the gap is about 3 mm. Meanwhile, it was seen that the point at which reduction in adiabatic effect caused by the gas conduction heat is saturated even though the vacuum pressure decreases is a point at which the vacuum pressure is approximately 4.5E−3 Torr. The vacuum pressure of about 4.5E−3 Torr may be defined as the point at which the reduction in adiabatic effect caused by the gas conduction heat is saturated. Also, when the effective heat transfer coefficient is about 0.01 W/mK, the vacuum pressure is about 1.2E−2 Torr. An example of a range of the vacuum pressure in the vacuum space according to the gap is presented. The support may include at least one of a bar, a connection plate, or a support plate. In this case, when the gap of the vacuum space is greater than or equal to about 3 mm, the vacuum pressure may be greater than or equal to A and less than about 5E−1 Torr, or be greater than about 2.65E−1 Torr and less than about 5E−1 Torr. As another example, the support may include at least one of a bar, a connection plate, or a support plate. In this case, when the gap of the vacuum space is greater than or equal to about 4.5 mm, the vacuum pressure may be greater than or equal to A and less than about 3E−1 Torr, or be greater than about 1.2E−2 Torr and less than about 5E−1 Torr. As another example, the support may include at least one of a bar, a connection plate, or a support plate, and when the gap of the vacuum space is greater than or equal to about 9 mm, the vacuum pressure may be greater than or equal to A and less than about 1.0×10^−1 Torr or be greater than about 4.5E−3 Torr and less than about 5E−1 Torr. Here, the A may be greater than or equal to about 1.0×10^−6 Torr and less than or equal to about 1.0E−5 Torr. The A may be greater than or equal to about 1.0×10^−5 Torr and less than or equal to about 1.0E−4 Torr. When the support includes a porous material or a filler, the vacuum pressure may be greater than or equal to about 4.7E−2 Torr and less than or equal to about 5E−1 Torr. In this case, it is understood that the size of the gap ranges from several micrometers to several hundreds of micrometers. When the support and the porous material are provided together in the vacuum space, a vacuum pressure may be created and used, which is middle between the vacuum pressure when only the support is used and the vacuum pressure when only the porous material is used.

FIG. 7 is a view illustrating various examples of the vacuum space. The present disclosure may be any one of the following examples or a combination of two or more examples.

Referring to FIG. 7, the vacuum adiabatic body according to the present disclosure may include a vacuum space. The vacuum space 50 may include a first vacuum space extending in a first direction (e.g., X-axis) and having a predetermined height. The vacuum space 50 may optionally include a second vacuum space (hereinafter, referred to as a vacuum space expansion portion) different from the first vacuum space in at least one of the height or the direction. The vacuum space expansion portion may be provided by allowing at least one of the first and second plates or the side plate to extend. In this case, the heat transfer resistance may increase by lengthening a heat conduction path along the plate. The vacuum space expansion portion in which the second plate extends may reinforce adiabatic performance of a front portion of the vacuum adiabatic body. The vacuum space expansion portion in which the second plate extends may reinforce adiabatic performance of a rear portion of the vacuum adiabatic body, and the vacuum space expansion portion in which the side plate extends may reinforce adiabatic performance of a side portion of the vacuum adiabatic body. Referring to FIG. 7*a*, the second plate may extend to provide the vacuum space expansion portion 51. The second plate may include a second portion 202 extending from a first portion 201 defining the vacuum space 50 and the vacuum space expansion portion 51. The second portion 202 of the second plate may branch a heat conduction path along the second plate to increase in heat transfer resistance. Referring to FIG. 7*b*, the side plate may extend to provide the vacuum space expansion portion. The side plate may include a second portion 152 extending from a first portion 151 defining the vacuum space 50 and the vacuum space extension portion 51. The second portion of the side plate may branch the heat conduction path along the side plate to improve the adiabatic performance. The first and second portions 151 and 152 of the side plate may branch the heat conduction path to increase in heat transfer resistance. Referring to FIG. 7*c*, the first plate may extend to provide the vacuum space expansion portion. The first plate may include a second portion 102 extending from the first portion 101 defining the vacuum space 50 and the vacuum space expansion portion 51. The second portion of the first plate may branch the heat conduction path along the second plate to increase in heat transfer resistance. Referring to FIG. 7*d*, the vacuum space expansion portion 51 may include an X-direction expansion portion 51*a* and a Y-direction expansion portion 51*b* of the vacuum space. The vacuum space expansion portion 51 may extend in a plurality of directions of the vacuum space 50. Thus, the adiabatic performance may be reinforced in multiple directions and may increase by lengthening the heat conduction path in the plurality of directions to improve the heat transfer resistance. The vacuum space expansion portion extending in the plurality of directions may further improve the adiabatic performance by branching the heat conduction path. Referring to FIG. 7*e*, the side plate may provide the vacuum space extension portion extending in the plurality of directions. The vacuum space expansion portion may reinforce the adiabatic performance of the side portion of the vacuum adiabatic body. Referring to FIG. 7*f*, the first plate may provide the vacuum space extension portion extending in the plurality of directions. The vacuum space expansion portion may reinforce the adiabatic performance of the side portion of the vacuum adiabatic body.

FIG. 8 is a view for explaining another adiabatic body. The present disclosure may be any one of the following examples or a combination of two or more examples. Referring to FIG. 8, the vacuum adiabatic body according to the present disclosure may optionally include another adiabatic body 90. Another adiabatic body may have a degree of vacuum less than that of the vacuum adiabatic body and be an object that does not include a portion having a vacuum state therein. The vacuum adiabatic body and another vacuum adiabatic body may be directly connected to each other or connected to each other through an intermedium. In this case, the intermedium may have a degree of vacuum less than that of at least one of the vacuum adiabatic body or another adiabatic body or may be an object that does not include a portion having the vacuum state therein. When the vacuum adiabatic body includes a portion in which the height of the vacuum adiabatic body is high and a portion in which the height of the vacuum adiabatic body is low, another adiabatic body may be disposed at a portion having the low height of the vacuum adiabatic body. Another adiabatic body may include a portion connected to at least a portion of the first and second plates and the side plate. Another adiabatic body may be supported on the plate or coupled or sealed. A degree of sealing between another adiabatic body and the plate may be lower than a degree of sealing between the plates. Another adiabatic body may include a cured adiabatic body (e.g., PU foaming solution) that is cured after being injected, a premolded resin, a peripheral adiabatic body, and a side panel. At least a portion of the plate may be provided to be disposed inside another adiabatic body. Another adiabatic body may include an empty space. The plate may be provided to be accommodated in the empty space. At least a portion of the plate may be provided to cover at least a portion of another adiabatic body. Another adiabatic body may include a member covering an outer surface thereof. The member may be at least a portion of the plate. Another adiabatic body may be an intermedium for connecting, supporting, bonding, or sealing the vacuum adiabatic body to the component. Another adiabatic body may be an intermedium for connecting, supporting, bonding, or sealing the vacuum adiabatic body to another vacuum adiabatic body. Another adiabatic body may include a portion connected to a component coupling portion provided on at least a portion of the plate. Another adiabatic body may include a portion connected to a cover covering another adiabatic body. The cover may be disposed between the first plate and the first space, between the second plate and the second space, or between the side plate and a space other than the vacuum space 50. For example, the cover may include a portion on which the component is mounted. As another example, the cover may include a portion that defines an outer appearance of another adiabatic body. Referring to FIGS. 8*a* to 8*f*, another adiabatic body may include a peripheral adiabatic body. The peripheral adiabatic body may be disposed on at least a portion of a periphery of the vacuum adiabatic body, a periphery of the first plate, a periphery of the second plate, and the side plate. The peripheral adiabatic body disposed on the periphery of the first plate or the periphery of the second plate may extend to a portion at which the side plate is disposed or may extend to the outside of the side plate. The peripheral adiabatic body disposed on the side plate may extend to a portion at which the first plate or may extend to the outside of the first plate or the second plate. Referring to FIGS. 8*g* to 8*h*, another adiabatic body may include a central adiabatic body. The central adiabatic body may be disposed on at least a portion of a central portion of the vacuum adiabatic body, a central portion of the first plate, or a central portion of the second plate.

Referring to FIG. 8*a*, the peripheral adiabatic body 92 may be placed on the periphery of the first plate. The peripheral adiabatic body may be in contact with the first plate. The peripheral adiabatic body may be separated from the first plate or further extend from the first plate (indicated by dotted lines). The peripheral adiabatic body may improve the adiabatic performance of the periphery of the first plate. Referring to FIG. 8*b*, the peripheral adiabatic body may be placed on the periphery of the second plate. The peripheral adiabatic body may be in contact with the second plate. The peripheral adiabatic body may be separated from the second plate or further extend from the second plate (indicated by dotted lines). The periphery adiabatic body may improve the adiabatic performance of the periphery of the second plate. Referring to FIG. 8*c*, the peripheral adiabatic body may be disposed on the periphery of the side plate. The peripheral adiabatic body may be in contact with the side plate. The peripheral adiabatic body may be separated from the side plate or further extend from the side plate. The peripheral adiabatic body may improve the adiabatic performance of the periphery of the side plate Referring to FIG. 8*d*, the peripheral adiabatic body 92 may be disposed on the periphery of the first plate. The peripheral adiabatic body may be placed on the periphery of the first plate constituting the vacuum space expansion portion 51. The peripheral adiabatic body may be in contact with the first plate constituting the vacuum space extension portion. The peripheral adiabatic body may be separated from or further extend to the first plate constituting the vacuum space extension portion. The peripheral adiabatic body may improve the adiabatic performance of the periphery of the first plate constituting the vacuum space expansion portion. Referring to FIGS. 8*e* and 8*f*, in the peripheral adiabatic body, the vacuum space extension portion may be disposed on a periphery of the second plate or the side plate. The same explanation as in FIG. 8*d* may be applied. Referring to FIG. 8*g*, the central adiabatic body 91 may be placed on a central portion of the first plate. The central adiabatic body may improve adiabatic performance of the central portion of the first plate. Referring to FIG. 8*h*, the central adiabatic body may be disposed on the central portion of the second plate. The central adiabatic body may improve adiabatic performance of the central portion of the second plate.

Figure 9:
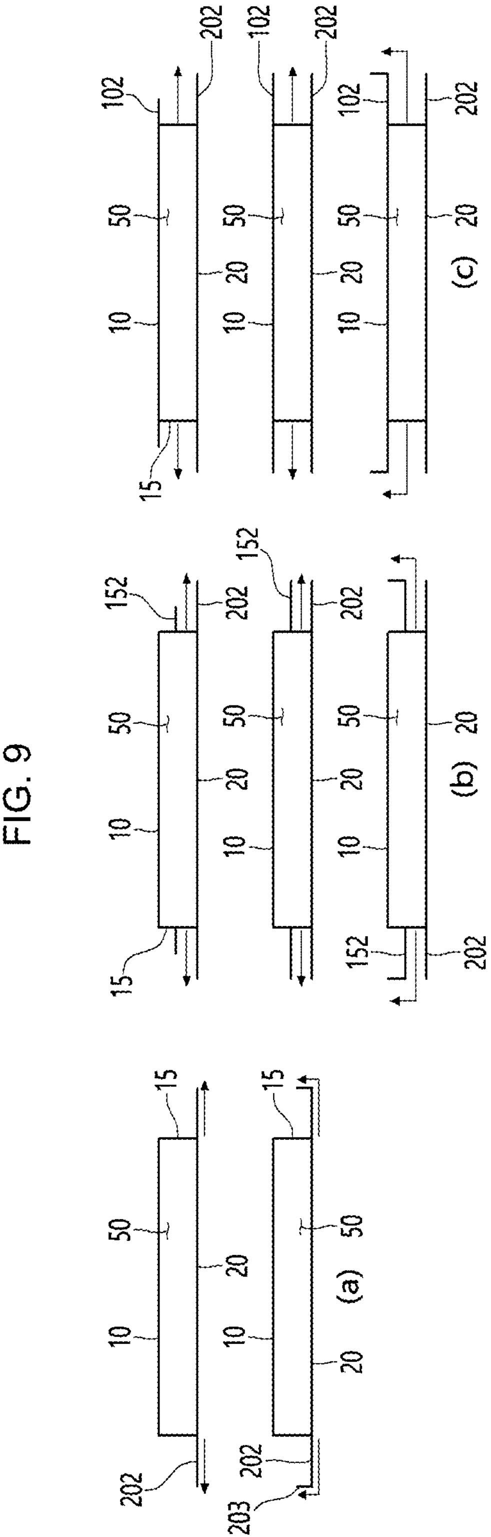
FIG. 9 is a view for explaining a heat transfer path between first and second plates having different temperatures.

FIG. 9 is a view for explaining a heat transfer path between first and second plates having different temperatures. An example of the heat transfer path is as follows. The present disclosure may be any one of the following examples or a combination of two or more examples.

The heat transfer path may pass through the extension portion at at least a portion of the first portion 101 of the first plate, the first portion 201 of the second plate, or the first portion 151 of the side plate. The first portion may include a portion defining the vacuum space. The extension portions 102, 152, and 202 may include portions extending in a direction away from the first portion. The extension portion may include a side portion of the vacuum adiabatic body, a side portion of the plate having a higher temperature among the first and second plates, or a portion extending toward the side portion of the vacuum space 50. The extension portion may include a front portion of the vacuum adiabatic body, a front portion of the plate having a higher temperature among the first and second plates, or a front portion extending in a direction away from the front portion of the vacuum space 50. Through this, it is possible to reduce generation of dew on the front portion. The vacuum adiabatic body or the vacuum space 50 may include first and second surfaces having different temperatures from each other. The temperature of the first surface may be lower than that of the second surface. For example, the first surface may be the first plate, and the second surface may be the second plate. The extension portion may extend in a direction away from the second surface or include a portion extending toward the first surface. The extension portion may include a portion, which is in contact with the second surface, or a portion extending in a state of being in contact with the second surface. The extension portion may include a portion extending to be spaced apart from the two surfaces. The extension portion may include a portion having heat transfer resistance greater than that of at least a portion of the plate or the first surface. The extension portion may include a plurality of portions extending in different directions. For example, the extension portion may include a second portion 202 of the second plate and a third portion 203 of the second plate. The third portion may also be provided on the first plate or the side plate. Through this, it is possible to increase in heat transfer resistance by lengthening the heat transfer path. In the extension portion, the above-described heat transfer resistor may be disposed. Another adiabatic body may be disposed outside the extending portion. Through this, the extension portion may reduce generation of dew on the second surface. Referring to FIG. 9*a*, the second plate may include the extension portion extending to the periphery of the second plate. Here, the extension portion may further include a portion extending backward. Referring to FIG. 9*b*, the side plate may include the extension portion extending to a periphery of the side plate. Here, the extension portion may be provided to have a length that is less than or equal to that of the extension portion of the second plate. Here, the extension portion may further include a portion extending backward. Referring to FIG. 9*c*, the first plate may include the extension portion extending to the periphery of the first plate. Here, the extension portion may extend to a length that is less than or equal to that of the extension portion of the second plate. Here, the extension portion may further include a portion extending backward.

Figure 10:
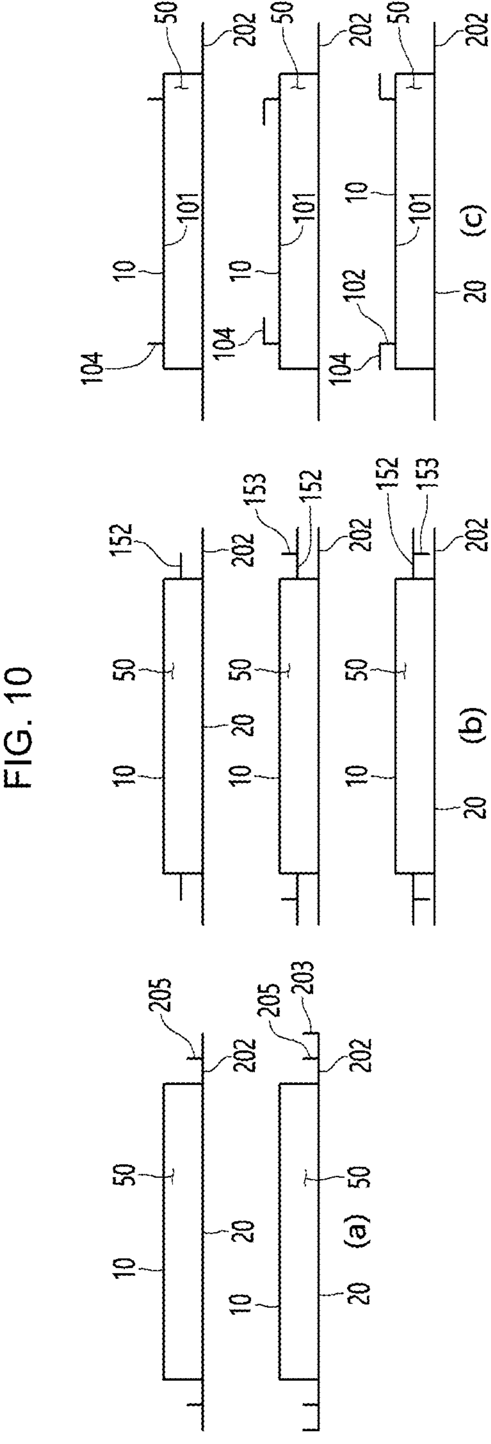
FIG. 10 is a view for explaining a branch portion on the heat transfer path between first and second plates having different temperatures.

FIG. 10 is a view for explaining a branch portion on the heat transfer path between first and second plates having different temperatures. An example of the branch portion is as follows. The present disclosure may be any one of the following examples or a combination of two or more examples.

Optionally, the heat transfer path may pass through portions 205, 153, and 104, each of which is branched from at least a portion of the first plate, the second plate, or the side plate. Here, the branched heat transfer path means a heat transfer path through which heat flows to be separated in a different direction from the heat transfer path through which heat flows along the plate. The branched portion may be disposed in a direction away from the vacuum space 50. The branched portion may be disposed in a direction toward the inside of the vacuum space 50. The branched portion may perform the same function as the extension portion described with reference to FIG. 9, and thus, a description of the same portion will be omitted. Referring to FIG. 10*a*, the second plate may include the branched portion 205. The branched portion may be provided in plurality, which are spaced apart from each other. The branched portion may include a third portion 203 of the second plate. Referring to FIG. 10*b*, the side plate may include the branched portion 153. The branched portion 153 may be branched from the second portion 152 of the side plate. The branched portion 153 may provide at least two. At least two branched portions 153 spaced apart from each other may be provided on the second portion 152 of the side plate. Referring to FIG. 10*c*, the first plate may include the branched portion 104. The branched portion may further extend from the second portion 102 of the first plate. The branched portion may extend toward the periphery. The branched portion 104 may be bent to further extend. A direction in which the branched portion extends in FIGS. 10*a*, 10*b*, and 10*c* may be the same as at least one of the extension directions of the extension portion described in FIG. 10.

Figure 11:
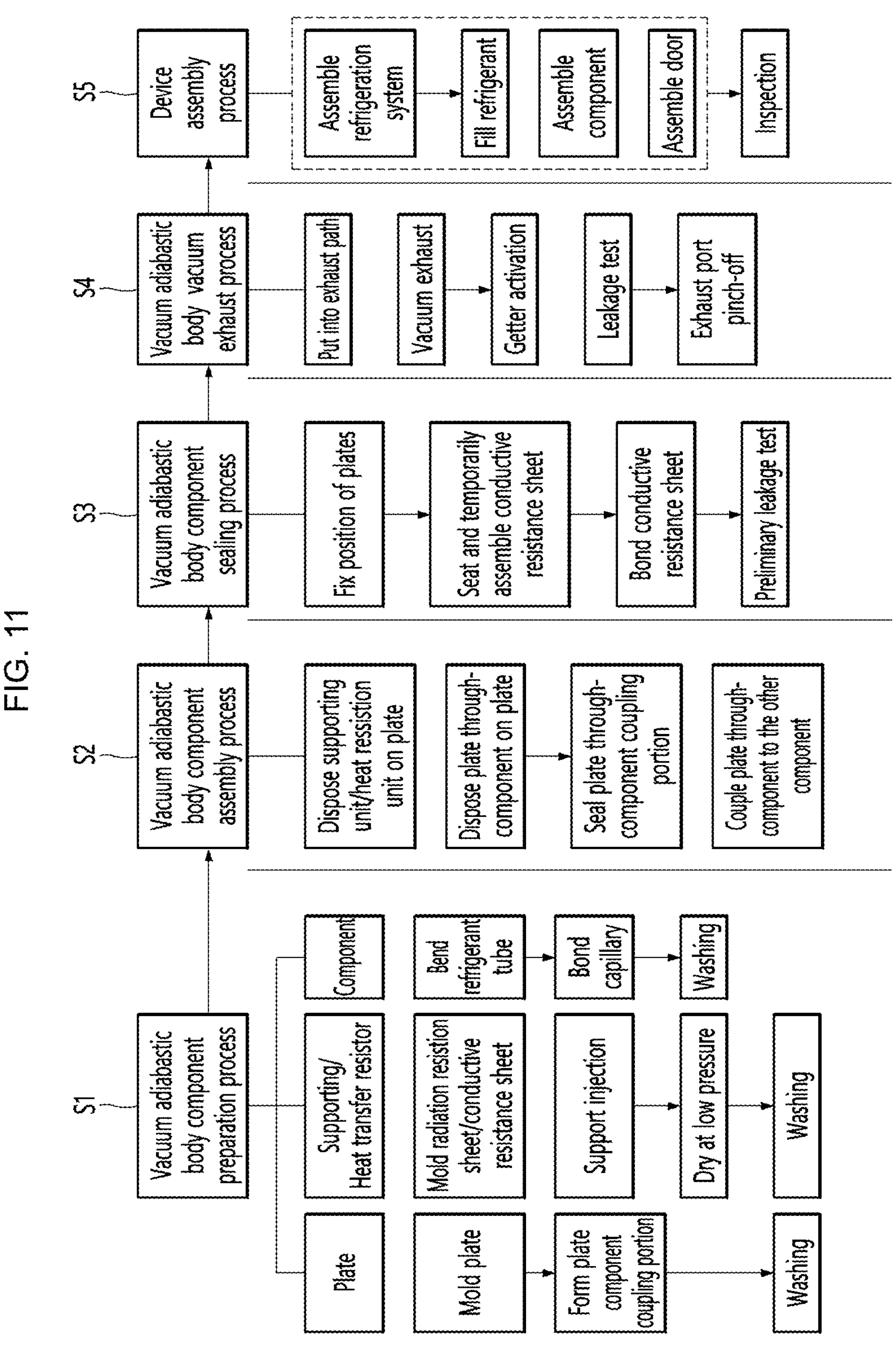
FIG. 11 is a view for explaining a method for manufacturing a vacuum adiabatic body.

FIG. 11 is a view for explaining a process of manufacturing the vacuum adiabatic body.

Optionally, the vacuum adiabatic body may be manufactured by a vacuum adiabatic body component preparation process in which the first plate and the second plate are prepared in advance. Optionally, the vacuum adiabatic body may be manufactured by a vacuum adiabatic body component assembly process in which the first plate and the second plate are assembled. Optionally, the vacuum adiabatic body may be manufactured by a vacuum adiabatic body vacuum exhaust process in which a gas in the space defined between the first plate and the second plate is discharged. Optionally, after the vacuum adiabatic body component preparation process is performed, the vacuum adiabatic body component assembly process or the vacuum adiabatic body exhaust process may be performed. Optionally, after the vacuum adiabatic body component assembly process is performed, the vacuum adiabatic body vacuum exhaust process may be performed. Optionally, the vacuum adiabatic body may be manufactured by the vacuum adiabatic body component sealing process (S3) in which the space between the first plate and the second plate is sealed. The vacuum adiabatic body component sealing process may be performed before the vacuum adiabatic body vacuum exhaust process (S4). The vacuum adiabatic body may be manufactured as an object with a specific purpose by an apparatus assembly process (S5) in which the vacuum adiabatic body is combined with the components constituting the apparatus. The apparatus assembly process may be performed after the vacuum adiabatic body vacuum exhaust process. Here, the components constituting the apparatus means components constituting the apparatus together with the vacuum adiabatic body.

The vacuum adiabatic body component preparation process (S1) is a process in which components constituting the vacuum adiabatic body are prepared or manufactured. Examples of the components constituting the vacuum adiabatic body may include various components such as a plate, a support, a heat transfer resistor, and a tube. The vacuum adiabatic body component assembly process (S2) is a process in which the prepared components are assembled. The vacuum adiabatic body component assembly process may include a process of disposing at least a portion of the support and the heat transfer resistor on at least a portion of the plate. For example, the vacuum adiabatic body component assembly process may include a process of disposing at least a portion of the support and the heat transfer resistor between the first plate and the second plate. Optionally, the vacuum adiabatic body component assembly process may include a process of disposing a penetration component on at least a portion of the plate. For example, the vacuum adiabatic body component assembly process may include a process of disposing the penetration component or a surface component between the first and second plates. After the penetration component may be disposed between the first plate and the second plate, the penetration component may be connected or sealed to the penetration component coupling portion.

An example of a vacuum adiabatic body vacuum exhaust process vacuum is as follows. The present disclosure may be any one of the, examples or a combination of two or more examples. The vacuum adiabatic body vacuum exhaust process may include at least one of a process of inputting the vacuum adiabatic body into an exhaust passage, a getter activation process, a process of checking vacuum leakage and a process of closing the exhaust port. The process of forming the coupling part may be performed in at least one of the vacuum adiabatic body component preparation process, the vacuum adiabatic body component assembly process, or the apparatus assembly process. Before the vacuum adiabatic body exhaust process is performed, a process of washing the components constituting the vacuum adiabatic body may be performed. Optionally, the washing process may include a process of applying ultrasonic waves to the components constituting the vacuum adiabatic body or a process of providing ethanol or a material containing ethanol to surfaces of the components constituting the vacuum adiabatic body. The ultrasonic wave may have an intensity between about 10 kHz and about 50 kHz. A content of ethanol in the material may be about 50% or more. For example, the content of ethanol in the material may range of about 50% to about 90%. As another example, the content of ethanol in the material may range of about 60% to about 80%. As another example, the content of ethanol in the material may be range of about 65% to about 75%. Optionally, after the washing process is performed, a process of drying the components constituting the vacuum adiabatic body may be performed. Optionally, after the washing process is performed, a process of heating the components constituting the vacuum adiabatic body may be performed.

The contents described in FIGS. 1 to 11 may be applied to all or selectively applied to the embodiments described with reference to the drawings below.

As an embodiment, an example of a process associated with a heat transfer resistor is as follows. The present disclosure may be any one of the following examples or a combination of two or more examples. The vacuum adiabatic body component preparation process may include a process of manufacturing the heat transfer resistor. Before the vacuum adiabatic body vacuum exhaust process is performed, the process of manufacturing the heat transfer resistor may be performed. The heat transfer resistor may be manufactured by a metal sheet. Optionally, before the vacuum adiabatic body vacuum exhaust process is performed, the process of washing the heat transfer resistor may be performed. Optionally, before the vacuum adiabatic body vacuum exhaust process is performed, a process of providing the component coupling portion to a portion of the heat transfer resistor may be performed. Optionally, the process of providing the component coupling portion may include a process of manufacturing a tube provided to the component coupling portion. The tube may be connected to a portion of the heat transfer resistor. The tube may be disposed in an empty space provided in the heat transfer resistor or in an empty space provided between the heat transfer resistors. Optionally, the process of providing the component coupling portion may include a process of providing a through-hole in a portion of the heat transfer resistor. Optionally, the process of providing the component coupling portion may include a process of providing a curved portion to at least one of the heat transfer resistor or the tube.

Optionally, during the vacuum adiabatic body vacuum exhaust process is performed, the process of deforming the heat transfer resistor may be performed. An example of the process of deforming the heat transfer resistor may be applied to the process of deforming the plate. An example of the process of deforming the heat transfer resistor may be applied when at least a portion of the plate and the heat transfer resistor are integrated with each other. Examples of the process of deforming the heat transfer resistor are as follows. The present disclosure may be any one of the following examples or a combination of two or more examples. First, the process may include a process in which the heat transfer resistor is recessed in a direction toward the internal space or toward the outside of the internal space. Therefore, a heat transfer path may extend to reduce a degree of heat conduction through the heat transfer resistor. Second, the process may include a process of changing a curvature radius of the heat transfer resistor. For example, the process of changing the curvature radius may include changing the curvature radius in at least a portion of a central portion and a peripheral portion of the heat transfer resistor. As another example, the process of changing the curvature radius may include a process of changing the curvature radius in the vicinity of an empty space provided inside the support, or a process of changing the curvature radius in the vicinity of an empty space provided to the outside of an edge of the support. As another example, the process of deforming the curvature radius may include a process of providing the heat transfer resistor to a portion, which is not in contact with the support. As another example, the process of changing the curvature radius may include a process of changing a curvature radius at at least a portion of the first portion or the second portion of the heat transfer resistor. Here, the first portion of the heat transfer resistor may be a portion defining a vacuum space. The second portion of the heat transfer resistor may be a portion extending in a direction away from the first portion to the vacuum space. Third, the process may include a process of changing a thickness of the heat transfer resistor. For example, the process of changing the thickness may include a process of changing a thickness at the portion supported by the support. As another example, the process of changing the thickness may include a process of changing a thickness in the vicinity of the empty space provided inside the support. As another example, the process of changing the thickness may include a process of changing a thickness in the vicinity of the empty space provided outside the edge of the support. As another example, the process of changing the thickness may include a process of providing the heat transfer resistor to a portion that is not in contact with the support. After the process of changing the curvature radius or the thickness in the central portion of the heat transfer resistor is performed, the process of changing the curvature radius or the thickness in the peripheral portion of the heat transfer resistor may be performed. After the process of changing the curvature radius or the thickness is performed in the vicinity of the empty space provided inside the support, the process of changing the curvature radius in the vicinity of the empty space provided outside the edge of the support may be performed. After the process of changing the curvature radius or the thickness in the first portion of the heat transfer resistor is performed, the process of changing the curvature radius or the thickness in the second portion of the heat transfer resistor may be performed. The process of deforming the heat transfer resistor while the vacuum adiabatic body exhaust process is performed may also be applied to the plate, and the same description will be omitted.

The process associated with the heat transfer resistor may optionally include a process related to the process of washing the heat transfer resistor. An example of a process sequence associated with the process of washing the heat transfer resistor is as follows. The present disclosure may be any one of the following examples or a combination of two or more examples. After the process of manufacturing the heat transfer resistor is performed, at least one of the process of manufacturing the heat transfer resistor and the process of washing the heat transfer resistor may be performed. After the process of manufacturing the heat transfer resistor is performed, the process of washing the heat transfer resistor may be performed. Before the process of manufacturing the heat transfer resistor is performed, the process of washing the heat transfer resistor may be performed. After the process of manufacturing the heat transfer resistor is performed, at least one of a process of providing the component coupling portion to a portion of the heat transfer resistor or the process of washing the heat transfer resistor may be performed. After the process of providing the component coupling portion to a portion of the heat transfer resistor is performed, the process of washing the heat transfer resistor may be performed.

The process associated with the heat transfer resistor may optionally include a process related to the process of providing the component coupling portion to the heat transfer resistor. An example of a process sequence related to the process of providing the component coupling portion to the heat transfer resistor is as follows. The present disclosure may be any one of the following examples or a combination of two or more examples. After the process of providing the through-hole in a portion of the heat transfer resistor is performed, at least one of a process of providing a curved portion to the heat transfer resistor, a process of providing a curved portion to the tube, or a process of providing a seal between the heat transfer resistor and the tube may be performed. After the process of providing the curved portion to at least a portion of at least one of the heat transfer resistor or the tube is performed, the process of sealing the gap between the plate and the tube may be performed. The process of providing the through-hole in the portion of the heat transfer resistor and the process of providing the curved portion on at least one of the heat transfer resistor or the tube may be performed at the same time. The process of providing the through-hole in a portion of the heat transfer resistor and the process of providing the seal between the heat transfer resistor and the tube may be performed at the same time. After the process of providing the curved portion to the tube connected to the heat transfer resistor is performed, the process of providing the through-hole in the portion of the heat transfer resistor may be performed. Before the vacuum adiabatic body vacuum exhaust process is performed, a portion of the tube may be provided and/or sealed to the heat transfer resistor, and after the vacuum adiabatic body vacuum exhaust process is performed, the other portion of the tube may be sealed.

The process associated with the heat transfer resistor may optionally include a process related to the process of providing the heat transfer resistor on at least a portion of the plate. An example of a process sequence related to the process of providing the heat transfer resistor to at least a portion of the plate is as follows. The present disclosure may be any one of the following examples or a combination of two or more examples. Before the vacuum adiabatic body exhaust process is performed, the heat transfer resistor may be connected to at least one of the first plate or the second plate. Before the vacuum adiabatic body exhaust process is performed, the heat transfer resistor may be disposed in a heat conduction path, through which a fluid flows along the internal space. Before the vacuum adiabatic body exhaust process is performed, the heat transfer resistor may be provided in a space between the first plate and the second plate. Before the vacuum adiabatic body exhaust process is performed, the heat transfer resistor may be provided at the inside of the plate or the surface of the plate. Before the vacuum adiabatic body exhaust process is performed, the heat transfer resistor may be disposed to be supported by at least a portion of the plate. Before the vacuum adiabatic body vacuum exhaust process is performed, the heat transfer resistor may be disposed to be supported by the support.

When at least a portion of the heat transfer resistor is used to be integrated with the plate, the example of the process associated with the heat transfer resistor may also be applied to the example of the process of the plate.

Figure 12:
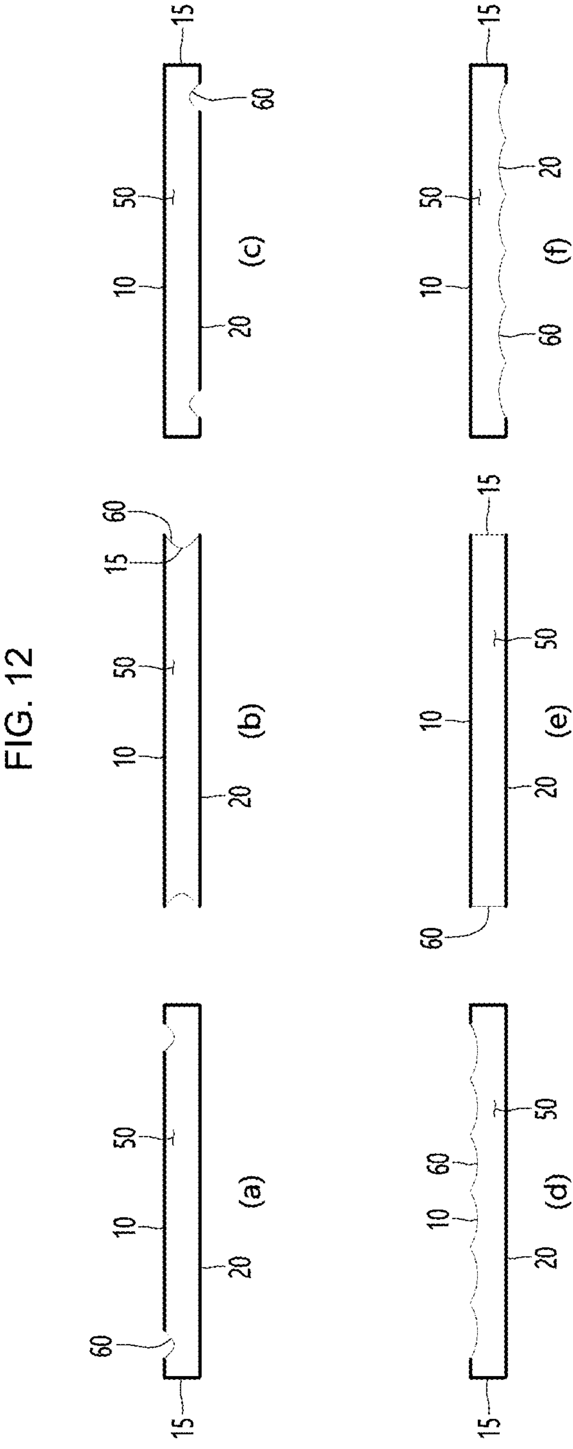
FIG. 12 is a view for explaining a conductive resistance sheet placed on a heat transfer path.

Referring to FIG. 12, the vacuum adiabatic body according to the present invention includes a heat transfer path formed between the plates having different temperatures, and optionally, the heat transfer path may include a portion passing through the heat transfer resistor. An example of the heat transfer resistor as the heat transfer path is as follows. The present disclosure may be any one of the following examples or a combination of two or more examples. The heat transfer resistor may be provided to be integrated with at least one of the first or second plate. The heat transfer resistor may be provided to be integrated with any one of the first and second plates. The heat transfer resistor may be provided as any one of the first and second plates. The heat transfer resistor may be provided as a portion of any one of the first and second plates. The heat transfer resistor may be provided as a component separated from the other one of the first and second plates. In this case, optionally, the heat transfer resistor may be provided to be coupled or sealed to the other one of the first and second plates. The heat transfer resistor may include a portion having a degree of heat transfer resistance, which is greater than that of at least a portion of the other one of the first and second plates. The heat transfer resistor may include a portion having a thickness less than that of at least a portion of the other one of the first and second plates. The heat transfer resistor may include a portion having a curvature radius less than that of at least a portion of the other one of the first and second plates. The heat transfer resistor may include a portion having a curvature radius less than that of at least a portion of the other one of the first and second plates.

Referring to FIG. 12*a*, the heat transfer resistor 60 may be provided on the first plate 10. The heat transfer resistor may be at least one of a radiation resistance sheet, a porous material, a filler, or a conductive resistance sheet. More preferably, the heat transfer resistor may be the conduction resistance sheet. A shield portion for thermal insulation or a member for reinforcing strength may be provided on an outer surface of the heat transfer resistor. The heat transfer resistor may be installed in two opposite peripheral portions of the vacuum space 50. The heat transfer resistor may be installed to be connected to two opposite edges of the vacuum space. Referring to FIG. 12*b*, the heat transfer resistor may be provided on the side plate. Referring to FIG. 12*c*, the heat transfer resistor may be provided on the second plate. In FIGS. 12*b* and 12*c*, the relationship between the plate and the heat transfer resistor is the same as that of FIG. 12*a*. Referring to FIG. 12*d*, the heat transfer resistor may be provided to be integrated with the first plate. In this case, the heat transfer resistor may be provided as the first plate or may be provided as a portion of the first plate. Referring to FIG. 12*e*, the heat transfer resistor may be provided to be integrated with the side plate. In this case, the heat transfer resistor may be provided as the side plate or as a portion of the first plate. Referring to FIG. 12*f*, the heat transfer resistor may be provided to be integrated with the second plate. In this case, the heat transfer resistor may be provided as the second plate or as a portion of the second plate.

The vacuum adiabatic body according to the present invention includes a heat transfer path formed between the plates having different temperatures, and optionally, the heat transfer path may include a portion passing through the side plate. An example of the side plate as the heat transfer path is as follows. The present disclosure may be any one of the following examples or a combination of two or more examples. The side plate may be provided to be integrated with at least one of the first or second plate. The side plate may be provided to be integrated with any one of the first and second plates. The side plate may be provided as any one of the first and second plates. The side plate may be provided as a portion of any one of the first and second plates. The side plate may be provided as a component separated from the other of the first and second plates. In this case, optionally, the side plate may be provided to be coupled or sealed to the other one of the first and second plates. The side plate may include a portion having a degree of strain resistance, which is greater than that of at least a portion of the other one of the first and second plates. The side plate may include a portion having a thickness greater than that of at least a portion of the other one of the first and second plates. The side plate may include a portion having a curvature radius less than that of at least a portion of the other one of the first and second plates. FIGS. 12*c* and 12*f* may illustrate an example in which the first plate and the side plate are integrally provided. FIGS. 12*a* and 12*d* may illustrate an example in which the second plate and the side plate are integrally provided. FIGS. 12*b* and 12*e* may illustrate an example in which the side plate is provided as a separate component that is separated from the first plate and the second plate.

In one or more embodiments, the second plate 20 and the side plate 15 may be provided as one body. The second plate 20 and the side plate 15 may be provided by shaping a single plate material. The second plate 20 and the side plate 15 may be provided through sheet metal-working. A seal capable of causing vacuum breakage may not be provided at a boundary between the second plate 20 and the side plate 15. The seal may refer to a portion for coupling the two different plates. For example, the seal may be a welding portion. There may be no seal at a contact portion between the second plate 20 and the side plate 15. The seal may be removed to improve vacuum reliability of the vacuum adiabatic body. Since coupling and sealing between the two members is unnecessary, a production rate may increase.

FIG. 13 is a perspective view of the outer case, FIG. 14 is a front view (a) and a cross-sectional view (a) of the outer case, and FIG. 15 is an enlarged view of portion A of FIG. 13, i.e., an enlarged view of a corner section of the second plate, and a non-corner section adjacent to the corner section. The corner section 211 and the non-corner section 212 may be the same in each corner section 211 of the second plate 20 provided in a square shape.

In one or more embodiments, a first straight portion 221, a first curved portion 231, a third straight portion 223, a second curved portion 232, and a second straight portion 222 may be sequentially provided from top to bottom in a height direction (Y-axis) of the vacuum space 50. The straight portion and the curved portion may be based on a shape of the second plate 20 in a cross-section (XY plane or YZ plane) in the height direction (Y-axis) of the vacuum space 50. At least any portion of the straight portion may have a straight shape. At least any portion of the curved portion may have a curved shape.

At least a portion of the first straight portion 221 may correspond to a second portion 152 of the side plate. At least a portion of the third straight portion 223 may correspond to a first portion 151 of the side plate. At least a portion of the second straight portion 222 may correspond to a first portion 201 of the second plate. At least a portion of the first curved portion 231 may correspond to a space between the first straight portion 221 and the third straight portion 223. At least a portion of the second curved portion 232 may correspond to a space between the second straight portion 222 and the third straight portion 223.

Optionally, the non-corner section 212 and the corner section 211 may be provided in series in a longitudinal direction (X-axis) of the vacuum space 50. For example, a corner first curved portion 2311 that is the first curved portion 231 provided in the corner section 211 may be placed by being followed by a non-corner first curved portion 2312 that is the first curved portion 231 provided in the non-corner section 212. The corner section 211 and the non-corner section 212 may be provided in series in a depth direction (Z-axis) of the vacuum space 50. The alignment of the corner section 211 and the non-corner section 212 may be the same for other corner sections. For example, a non-corner first curved portion 2312 that is the first curved portion 231 provided in the non-corner section 212 may be placed by being followed by the corner first curved portion 2311 that is the first curved portion 231 provided in the corner section 211. This arrangement may be the same for other curved or straight portions.

Optionally, a thickness of at least a portion of the plurality of curved portions may have a maximum value in a thickness of the second plate 20. The thickness of any one of the plurality of curved portions may have a maximum thickness value among the respective portions of the second plate 20. The curved portion may be placed on a portion connecting the two straight portions to each other. Each of the two straight portions may be a member that transmits force in one direction. Bending stress may be concentrated on the curved portion. The concentrated bending stress may be stress that transmits force transmitted from any one of the two straight lines in the other direction. The concentrated bending stress may cause breakage of the curved portion. To correspond to the concentrated bending stress, the curved portion may be provided to be thicker than that of each of other portions of the outer case 210. For example, points j to o may be provided to be thicker than that of at least one of points b, f, t to y, and d.

A thickness of at least a portion of the first curved portion 231 may have a maximum thickness value among the portions of the second plate 20. The first curved portion 231 may connect the second portion 152 of the side plate to the first portion 151 of the side plate.

The second portion 152 of the side plate may be fixed by a jig when the second plate 20 and the first plate 10 are sealed to each other. During the sealing, the jig may hold the second portion 152 of the side plate. The second portion 152 of the side plate may support an entire load of the vacuum adiabatic body. The first curved portion 231 may be adjacent to a fixed end of the jig. Therefore, the first curved portion 231 may have the thickest thickness in the outer case 210. The first straight portion 221 may be a portion to be gripped when assembling and transporting the vacuum adiabatic body. The first curved portion 231 may be a portion adjacent to the first straight portion 221. Therefore, the first curved portion 231 may have the thickest thickness in the second plate 20.

When sealing the first plate 10 and the second plate 20, the two members may be strongly clamped through the jig. Here, a curved shape of the first plate 10 may be deformed by an applied pressure. In this case, to absorb the deformation of the first plate 10, the first curved portion 231 may be provided to be the thickest in the second plate 20. To allow the first plate 10 and the second plate 20 to be in close contact with each other during the sealing, a vacuum pressure may be applied to the contact surface of the two cases. In this case, to absorb the deformation of the first plate 10, the first curved portion 231 may be provided to be the thickest in the second plate 20.

In one or more embodiments, the first straight portion 221 may have a portion extending into the additional adiabatic body 90. The first curved portion 231 may be provided to be the thickest in the second plate 20. When the additional adiabatic body 90 is mounted, the first straight portion 221 may sufficiently resist force received from the additional adiabatic body 90. For example, when foaming the urethane, an expansion pressure of the foaming urethane may apply force to the first straight portion 221. In this case, the first curved portion 231 may sufficiently support the force transmitted from the first straight portion 221. For this, the first curved portion 231 may be provided to be the thickest in the plate of the vacuum adiabatic body.

Optionally, the first curved portion 231 may be provided to be the thickest in the second plate 20. When the vacuum space 50 is exhausted, strong force due to a pressure difference may be applied to a point from which the first plate 10 and the second plate 20 are branched. The branching point of the first plate 10 and the outer case 210 may mean a point at which the contact between the first plate 10 and the second plate 20 is released. The first curved portion 231 may resist force according to the pressure difference. The ultrasonic wave may be provided to the point from which the plate 10 and the second plate 20 are branched, i.e., the first curved portion 231. The point from which the first plate 10 and the second plate 20 are branched may mean sealing that is permanent connection.

As described above, the first curved portion 231 may be provided to be the thickest in the second plate 20. Thus, it may prevent at least one of deformation of the first curved portion 231 itself, deformation of the first straight portion 221, relative movement between members, or distortion of the vacuum adiabatic body from occurring.

In one or more embodiments, the first curved portion 231 may include at least one of a first-1 curved portion 2321 adjacent to the first straight portion 221 or a first-2 curved portion 2322 adjacent to the third straight portion 223. The first-1 curved portion 2321 may have a curvature radius less than that of the first-2 curved portion 2322. The first-1 curved portion 2321 may be a portion adjacent to the first straight portion 221 and may directly receive large rotational moment. The first-1 curved portion 2321 may have a curvature radius less than that of the first-2 curved portion 2322 to correspond to the large rotational moment. The first-1 curved portion 2321 may be provided to be thicker than the first-2 curved portion 2322. The first-1 curved portion 2321 may be a portion adjacent to the first straight portion 221 and may receive large stress. For this reason, it may be provided to be thicker than the first-2 curved portion 2322. For example, the point h may have a curvature radius less than that of the point i. The point h may be provided to be thicker than the point i. Other curved portions may be provided to be the same.

In one or more embodiments, the thickness of the central portion of the first curved portion 231 may be greater than that of a peripheral portion of the first curved portion 231. Thus, the central portion of the first curved portion 231 subjected to the large stress may be more firmly reinforced. Here, the central portion may mean a central portion of the first curved portion in a height direction of the vacuum space of the outer case, that is, a XY plane or YZ plane of the outer case.

In one or more embodiments, in at least one of the plurality of curved portions, an amount of change in thickness per unit length in the corner section 211 may be greater than that of change in thickness per unit length in the non-corner section 212. Here, the unit length may be a unit length in the height direction of the vacuum space unit 50. In the corner section 211, an external impact may occur more frequently than in the non-corner section 212. The corner section 211 may be subjected to an external impact greater than that applied to the non-corner section 212. The corner section 211 may be a point at which the extension direction is changed, and stress may be concentrated. To respond to at least one of the external impact and/or concentrated stress, the change in thickness per unit length of the corner section 211 may be greater than the change in thickness per unit length of the non-corner section 212.

In the first curved portion 231, an amount of change in thickness per unit length in the corner section 211 may be greater than an amount of change in thickness per unit length in the non-corner section 212. For example, the change in thickness from the point k to the point n may be greater than that in thickness from the point p to the point q. Thus, it may withstand the external impact and/or concentrated stress on the first straight portion 221 of the corner section 211. The second straight portion 222 of the corner section 211 may be subjected to an external impact less than that applied to the first straight portion 221 of the corner section 211.

In one or more embodiments, in at least one of the plurality of curved portions, a thickness of the curved portion placed in the corner section 211 may be greater than that of the curved portion placed in the non-corner section 212. For example, the point k may be provided to be thicker than the point p. Thus, it may more smoothly respond to the external impact and concentrated stress concentrated to the corner section 211. The thickness of the corner first curved portion 2311 that is the corner section 211 of the first curved portion 231 may be provided to be thicker than the non-corner first curved portion 2312 that is the non-corner section 212 of the first curved portion 231.

The first curved portion 231 may include the thickest point in the second plate 20. The corner first curved portion 2311 may include the thickest point in the second plate 20. Thus, it may respond to the external impact and/or concentrated stress. The second curved portion 232 may include the thinnest point in the second plate 20. Thus, the point at which the number of times of external impact to be applied and/or the point at which the stress is dispersed may be thinned, and other portions may be reinforced. For example, the point k may be the thickest point, and the point n may be the thinnest point. The thickness of the first curved portion 231 may be thicker than that of the second curved portion 232. Thus, it may reinforce the portion to which the stress is concentrated. Here, each of the thickness of the first curved portion 231 and the thickness of the second curved portion 232 may be a mean thickness of each curved portion.

In one or more embodiments, the thickness of the first straight portion 221 may be greater than the thickness of the second straight portion 222. The thickness of the second straight portion 222 may be greater than the thickness of the third straight portion 223. The thickness of the first straight portion 221 may increase to prevent damage due to the clamping action of the jig. The third straight portion 223 may be an area to which a small load extending in the height direction of the vacuum space 50 is applied. Therefore, the third straight portion 223 may be provided to have the thinnest thickness in the straight portion. For example, the point b may be thicker than the point d, and the point d may be thicker than the point f. Here, the thickness of each of the first, second, and third straight portions may be a mean thickness of each of the straight portions.

In one or more embodiments, the first straight portion 221 may have the thickest point among the plurality of straight portions in the corner section 211. The first straight portion 221 of the corner section 211 may include the thickest point among the straight portions. Thus, it may respond to the external impact and/or concentrated stress. The second straight portion 222 of the corner section 211 may include the thinnest point among the plurality of straight portions. Thus, the point at which the number of times of external impact to be applied and/or the point at which the stress is dispersed may be thinned, and other portions may be reinforced. For example, the point b may be the thickest point among the plurality of straight portions, and the point f may be the thinnest point. In the corner section 211, the first straight portion 221 may be thicker than the second straight portion 222. Each of the thickness of the first straight portion 221 and/or the thickness of the second straight portion 222 may be a mean thickness of each straight portion.

The present disclosure may be any one of the following examples or a combination of two or more examples.

FIG. 16 is a view illustrates an embodiment of manufacturing the outer case.

Referring to FIG. 16, a base material that is a flat plate to be processed into the second plate 20 is seated on a first restriction frame 310. The base material may be provided in a rectangular shape. A peripheral portion of the base material may be pressed by a second restriction frame 320 and thus be fixed so as not to move vertically. The base material may be fixed without moving vertically between the first restriction frame 310 and the second restriction frame 320. Even when the first and second restriction frames 310 and 320 are restricted, the base material may move by a predetermined amount in a left and right direction. Here, the movement of the base material may include a stretching action.

In an inner region of the second restriction frame 320, the movable frame 330 may move downward to press the base material. The base material may be deformed to be in contact with at least one of the movable frame 330 and the first restriction frame 310. Here, the peripheral portion of the base material restricted by the first and second restriction frames 310 and 320 may move. Since the base material is deformed, it may process the base material into the shape of the second plate 20. When a displacement of the movable frame 330 is finished, the base material may become the second plate 20. When the displacement of the movable frame 330 is finished, the movable frame 330 and the first restriction frame 310 may be spaced a predetermined distance from each other. The base material may have the shape of the second plate 20 according to the distance.

In one or more embodiments, the first portion 151 of the side plate may be inclined at an angle from the first portion 201 of the second plate. The first portion 151 of the side plate may extend in a direction away from the second space. A side that is closer to the first space of the first portion 151 of the side plate may be farther from the central portion of the vacuum adiabatic body than a side that is closer to the second space of the first portion 151 of the side plate. The first portion 151 of the side plate may be wider at the side closer to the first space. The first portion 151 of the side plate may be provided to be narrower toward the bottom. The support 30 and/or the heat transfer resistor 32 may be guided from the first portion 151 of the side plate. The support 30 and the heat transfer resistor 32 may be inserted through the side closer to the first space. The support 30 and the heat transfer resistor 32 may be disposed to correspond to the width of the vacuum space in a longitudinal direction.

FIGS. 17 and 18 are views illustrate another embodiment of manufacturing the outer case.

Referring to FIG. 17, the base material may be fixed between the first restriction frame 310 and the second restriction frame 320. The peripheral portion of the base material may be exposed to the outside of the first and second restriction frames 310 and 320. The first movable frame 3301 may move upward to deform the peripheral portion of the base material. The first portion 151 of the side plate may be defined by the upward movement of the first movable frame 330. A portion to which the first and second restriction frames are fixed may be the first portion 201 of the second plate.

When the first processing illustrated in FIG. 18 is finished, processing for providing the second portion 152 of the side plate may be additionally performed. Referring to FIG. 18, a third restriction frame 3201 may be additionally installed outside the first portion 151 of the side plate. Thereafter, the base material may be expanded by pushing the second movable frame 3302 outward. The second portion 152 of the side plate may be provided by the action of the second movable frame 3302. During the deformation of the base material using the second movable frame 3302, there is a possibility that wrinkles occurs on a surface of the base material.

According to the manufacturing method of this embodiment, there are limitations that three restriction frames 310, 320, and 3201 and two movable frames 3301 and 3302 are required, the operation is cumbersome, and the movement and action of the restriction frame and the movable frame are difficult. According to the manufacturing method of this embodiment, when the thickness of the outer case is thick, it may obtain an advantage of providing a shape according to the design.

According to the manufacturing method according to the two foregoing embodiments, the action of extension and contraction may occur in the base material in response to the displacement of the movable frame. After the base material is manufactured as the outer case, the thickness may vary. The thickness of the outer case may be different before and after performing a vacuum adiabatic body component preparation process for providing the outer case as a component of the vacuum adiabatic body. After performing the vacuum adiabatic body component preparation process, a thickness of at least a portion of the plurality of curved portions may be the thickest on an entire area of the outer case.

When the vacuum adiabatic body component preparation process is performed, at least a portion of the plurality of curved portions may be thicker than the base material. Since the thickness increases compared to that of the base material, it may well withstand the external impact and/or concentrated stress. For example, when compared to the base material, the outer case may have a reduced thickness as a whole. However, the thickness may conversely increase at a specific point of the base material. For example, any point of at least a portion of the curved portion may have a maximum thickness in the outer case. For example, the corner first curved portion 2311 may have the thickest thickness in the outer cases.

FIG. 19 is a partial cross-sectional perspective view of a vacuum adiabatic body, FIG. 20 is a partial front view of the cross-sectional view of FIG. 19, and FIG. 11 is a partial cross-sectional view of the single body.

According to an embodiment, the single body 210 may provide the second plate 20 and the side plate 15 as one body. Here, the meaning of the one body may mean that the two members define one body without a coupling portion such as a seal. The single body 210 may provide the first portion 201 of the second plate, the first portion 151 of the side plate, and the second portion 152 of the side plate as one body. A seal capable of causing vacuum breakage may not be provided at a boundary between the second plate 20 and the side plate 15. The single body 210 may not have a portion at which the second plate 20 and the side plate 15 are sealed. Here, at least a portion of the single body 210 may be a member that provides a wall between the second space and the vacuum space 50. The single body 210 may be processed to define an accommodation space. Here, at least a portion of the single body 210 may be a member that provides a wall between another adiabatic body and the vacuum space 50.

The first plate 10 may be provided as a thin plate that is thinner than the second plate 20. The second plate 10 may be provided as a thin plate that is thinner than the second plate 15. The first plate 10 may be a heat transfer resistor as a thin plate. The heat transfer resistor may be a conductive resistance sheet. The heat transfer resistor has a small cross-sectional area in a heat flow direction and thus may refer to a sheet that resists the heat conduction. The heat transfer resistor may be a thin metal plate. The first plate 10 may include a heat transfer resistor. The first plate 10 and the heat transfer resistor may be provided as one body. The first plate 10 may be provided as a thin metal plate-like member having a thin thickness.

Each of the first plate 10 and/or the single body 210 may be made of stainless steel as a material. The first plate 10 may be coupled to the single body 210 at the second portion 152 of the side plate. The first plate 10 may serve as the heat transfer resistor at a contact portion between the first portion 101 of the first plate and the second portion 152 of the side plate. In the first portion 101 of the first plate adjacent to the second portion 152 of the side plate, the first plate 10 may serve as the heat transfer resistor. The first plate 10 may be provided to be flat and elongated without the curved portion. The heat transfer resistor may be provided to be flat. The heat transfer resistor may not have an artificially processed curved portion except for a curved portion that is naturally contracted and deformed by the vacuum pressure.

The heat transfer resistor may not have the curved portion. The heat transfer resistor may be provided to be thin to a thickness of about 0.1 mm. Since the heat transfer resistor is quite thin, if the curved portion is artificially provided, it becomes too thin and is vulnerable to breakage. The curved portion may be damaged during the vacuum exhaust process. Since an additional process such as pressing is not required to additionally process the curved portion, it is more convenient. The heat transfer resistor, that is, the first plate 10, may have a flat shape without artificially processing the curved portion as in the embodiment. The first plate 10 of the first plate 10 may provide the heat transfer resistor.

The heat transfer resistor may be provided not at a side of the side plate 15, but at a side of the first plate 10. When the heat transfer resistor is provided on a side surface of the vacuum adiabatic body extending in the height direction of the vacuum space 50, a lateral load received by the heat transfer resistor may be excessively large. Here, the side surface of the vacuum adiabatic body may mean a surface on which the side plate is placed. In this case, the heat transfer resistor may be in contact with the support to increase in risk of damage of the support 30. The side plate 15 of the vacuum adiabatic body may be provided as one body with the second plate 20 rather than the first plate 10. For example, the first plate 10 may have a thickness of about 0.1 mm. The single body 210 may have a thickness of about 0.5 mm.

An extension direction A of the second plate 20 and the side plate 15 may form an obtuse angle. An inner space of the single body 210 may define an accommodation space that is convex downward. The single body 210 may provide an accommodation space in the form of a basin. The accommodation space may provide the vacuum space 50. In the inner space provided by the walls of the second plate 20 and the side plate the support 30 may be conveniently seated from top to bottom. The side plate 15 may guide the seating of the support 30.

The support 30 may be disposed adjacent to the side plate 15. The single body 210 may have a predetermined thickness and may not be deformed by the vacuum pressure of the vacuum space 50. A distance between the support 30 and the side plate 15 may be less than a length of the first straight portion 221. Since the support 30 maintains the interval between the first plate 10 and the second plate 20 up to the edge of the vacuum space 50, the outer wall structure of the vacuum space 50 may be more firmed. The deformation of the vacuum adiabatic body and/or damage of the first and second plates and/or the side plate 15, which occur in the peripheral portion of the conductive resistance sheet according to the related art, may be reduced.

FIG. 22 is a reference view for explaining a curvature of each member of the vacuum adiabatic body according to an embodiment.

Referring to FIG. 22, each of the first, second, and side plates 10, 20, and 15 may have a predetermined curvature to provide the vacuum adiabatic body. Each position of the first, second and side plates 10, 20, and 15 is described with uppercase letters of the alphabet.

The reference symbol A indicates the first curved portion 231. The inside of the curvature radius of the first curved portion 231 may be 1R. The outside of the curvature radius may be provided as 1.5R. Here, the reference symbol R is a dimensionless unit that is compared with the curvature of other portions. The first curved portion 231 may have a small curvature radius for contact with the first plate 10 and/or the formation of the vacuum space 50. However, it is preferable to have a curvature radius suggested in order to secure sufficient strength and breakage of the single body 210.

The reference symbol B indicates the second curved portion 232. The inside of the curvature radius of the second curved portion 232 may be 1.5R. The outside of the curvature radius may be provided as 2.0R.

Reference symbol C may be a boundary between the second portion 202 and the third portion of the second plate. The inside of the curvature radius may be 4.5R. The outside of the curvature radius may be provided as 5R. The boundary portion may be a portion capable of forming an outer appearance and may be directly touched by the human body, and thus, it is preferable to have a smooth curved surface for safety. Since the boundary portion is bent in an XYZ triaxial direction, the curvature radius may increase.

A reference symbol D is a curvature of an edge of the third portion 203 of the second plate. The reference symbol D is a portion bent along the vacuum space 50. The inside of the curvature radius of the edge may be 1R. The outside of the curvature radius may be provided as 1.5R. The edge a portion that is in contact with the first plate 10 without being in direct contact with the consumer.

A reference symbol E indicates a curvature caused by partially supporting the first portion 101 of the first plate 10 on the support 30.

A reference symbol F indicates a curvature caused by partially supporting the first portion 201 of the second plate of the single body 210 on the support 30. A curvature radius of the first portion 101 of the first plate may be less than a curvature radius of the first portion 201 of the second plate.

A reference symbol G is a curvature of the first plate 10 in the gap between the edge of the support 30 and the first straight portion 221. This curvature may be generated by the vacuum pressure of the vacuum space 50. The curvature of the portion G may be propagated along the second portion 152 of the side plate.

A curvature of a portion H spaced apart from the portion G toward the edge of the second portion 152 of the side plate may occur. The portion H may be a curvature generated by propagating a thickness difference of the single body 210 and/or the curvature of the portion G. The curvature radius of the portion G may be less than the curvature radius of the portion H. The curvature radius of each of the portion G and the portion H may be less than the curvature radius of the portion E.

Referring back to FIG. 15, a first straight portion 221, a first curved portion 231, a third straight portion 223, a second curved portion 232, and a second straight portion 222 may be sequentially provided from top to bottom in a height direction (Y-axis) of the vacuum space 50. The straight portion and/or the curved portion may be based on the shape of the single body 210 in the cross-section in the height direction (Y-axis) of the vacuum space 50. At least any portion of the straight portion and/or the curved portion may be a straight line, and at least a portion of the curved portion may be a curved line.

At least a portion of the first straight portion 221 may correspond to a second portion 152 of the side plate. At least a portion of the third straight portion 223 may correspond to a first portion 151 of the side plate. At least a portion of the second straight portion 222 may correspond to a first portion 201 of the second plate. At least a portion of the first curved portion 231 may correspond to a space between the first straight portion 221 and the third straight portion 223. At least a portion of the second curved portion 232 may correspond to a space between the second straight portion 222 and the third straight portion 223.

The third straight portion 223 may be thinner than the first straight portion 221. The third straight portion 223 may be thinner than the second straight portion 222. The third straight portion 223 may be the thinnest among all the straight portions provided in the single body. The first and second straight portions may be provided to have the same thickness. Since the third straight portion 223 serves as a heat transfer path, the third straight portion 223 may be provided to be thin so as to improve the adiabatic performance. Since the third straight portion 223 is protected by another adiabatic body 90 from the side of the vacuum space, it is None necessary to be thick.

A non-corner portion 212 and a corner portion 211 may be sequentially provided in any one longitudinal direction (X-axis) or depth direction (Z-axis) of the vacuum space 50. For example, a corner first curved portion 2311 that is the first curved portion 231 provided in the corner section 211 may be placed by being followed by a non-corner first curved portion 2312 that is the first curved portion 231 provided in the non-corner section 212. The corner portion 211 and the non-corner portion 212 may be sequentially provided in another longitudinal direction (Z-axis) of the vacuum space 50. The alignment of the corner section 211 and the non-corner section 212 may be the same above other corner sections. For example, a non-corner first curved portion 2312 that is the first curved portion 231 provided in the non-corner section 212 may be placed by being followed by the corner first curved portion 2311 that is the first curved portion 231 provided in the corner section 211.

The first straight portion 221 is a portion that provides a sealing surface by the seal. The seal may be created by laser welding. The laser welding may be performed by heating each plate using a high-power laser. To smoothly fuse each member through the laser welding, the surface to be fused may be flat.

FIG. 23 is a cross-sectional view of a peripheral portion of the vacuum adiabatic body and illustrates a curvature radius from a portion E to a portion H in more detail.

Referring to FIG. 23, a curvature radius of the portion G and the portion H will be described in more detail. A curvature radius of the portion G may be affected by the vacuum pressure of the vacuum space 50 and/or the curvature propagating from the vicinity of the portion G to the portion G. The curvature radius of the portion H may be affected by the curvature propagated by the shape of the first curved portion 231 and/or the thickness difference between the first straight portion 221 and the first curved portion 231.

The first curved portion 231 may protrude upward compared to the first straight portion 221. The first curved portion 231 may be provided to be thick so as to reduce heat conduction and secure a required strength level. The first curved portion 231 may move toward the vacuum space. The movement of the first curved portion 231 may be caused by rotation of the side plate 15. The side plate 15 may be rotationally deformed toward a center of the vacuum space 50 with respect to the second curved portion 232. The movement of the first curved portion 231 may allow the first curved portion 231 to protrude upward. The first curved portion 231 may be affected by the curvature propagated from the portion G. The portion G may be depressed into the vacuum space 50 by the vacuum pressure of the vacuum space 50.

Due to the protrusion of the first curved portion 231 and/or the propagation of the curvature of the portion G, the portion H may be spaced apart from the first curved portion 231. The first plate 10 may include a portion H2 in contact with the first curved portion 231 and a portion H1 disposed in a direction away from the vacuum space 50 at the portion H2. The portion H1 may provide a trapped air between the single body 210 and the first plate 10. In the portion H1, the single body 210 and the first plate 10 may not be in contact with each other. A seal may be disposed in a direction away from the vacuum space 50 at the portion H1. As described above, since the single body 210 and the first plate 10 are spaced apart from each other, a vacuum layer may be additionally generated, and the vacuum layer may perform the adiabatic operation. The trapped layer may be generated by the deformation propagation in the portion G and/or the shape of the first straight portion 221. The curvature radius of the portion G may be less than the curvature radius of the portion E. The curvature radius of the portion H may be less than the curvature radius of the E portion. If there is no influence of the curvature propagation along the first curved portion 231 and first plate 10, the curvature radius of the portion G may be greater than the curvature radius of the portion E. This is because the area on which the vacuum pressure is applied in the portion G is small.

The curvature radius of the portion E may be less than the curvature radius of the portion F. This is because the first plate 10, which is a thinner member than the single body 210, is capable of being extended to a greater extent when the vacuum pressure is applied.

FIG. 24 is a view illustrates that an outer cover is mounted to the first plate and the single body.

Referring to FIG. 24, a gap between the first plate 10 and the inner panel 111 is greater than a gap between the single body 210 and the outer panel 211. The gap between the plate and the panel may perform the adiabatic operation as the trapped layer. The thickness of the adiabatic layer that is capable of being obtained by the trapped layer may be greater than the gap between the first plate 10 and the inner panel 111. When each of the covers is provided, it is possible to obtain further improved adiabatic performance toward the first plate 10.

In a first case in which the cover is provided, and there is the trapped layer between the plate and the cover, a second case in which the cover is provided but no trapped layer between the plate y and the cover, and a third case in which the cover is not provided, and no trapped layer is provided between the plate and the cover, the first case may correspond to this embodiment, and the most improved adiabatic effect may be obtained.

The heat transfer path may be branched into first and second paths. The first path may include a heat transfer resistor provided to reduce a heat transfer amount between a first space provided in the vicinity of the first plate and a second space provided in the vicinity of the second plate. The heat transfer resistor may include a first portion providing a wall defining the vacuum space and a second portion extending from the first portion. The first path may be provided in the second portion. The second path may be provided on a side plate connecting the first plate to the second plate. The portion may include a portion extending in the height direction of the vacuum space.

The second path may be provided in the extending portion. The present invention may be any one of the examples presented below or a combination of two or more examples.

In an embodiment, the vacuum adiabatic body may include a seal that seals a gap between the first plate 10 and the second plate 20 to provide a first plate 10 having a first temperature, a second plate 20 having a second temperature different from the first temperature, and a vacuum space 50. Optionally, the vacuum adiabatic body may be manufactured through a vacuum adiabatic body component preparation process of preparing the first plate and the second plate in advance, a vacuum adiabatic body component assembly process of assembling the prepared first and second plates with each other, and a vacuum adiabatic body vacuum exhaust process of discharging a gas within a space defined between the first plate and the second plate after the component assembly process. Optionally, the vacuum adiabatic body may include a heat transfer path between a first space provided near the first plate and a second space provided near the second plate. Optionally, the heat transfer path may be provided to be branched. Optionally, before the vacuum adiabatic body vacuum exhaust process, the vacuum adiabatic body may be manufactured in a vacuum adiabatic boy component sealing process, in which the space between the first plate and the second plate is sealed. Optionally, after the vacuum adiabatic body vacuum exhaust process, a device assembly process in which the vacuum adiabatic body and components constituting the device may be coupled to each other may be performed.

Optionally, the vacuum adiabatic body may include a heat transfer path through which heat is transferred between a first space provided near the first plate 10 and a second space provided near the second plate 20. Examples related to the heat transfer path are as follows. The present disclosure may be any one of the following examples or a combination of two or more examples. The heat transfer path may include a heat transfer path by conduction. The heat transfer path may be branched from the outside of the vacuum space. The heat transfer path may be branched from the inside of another heat adiabatic body 90. Another heat adiabatic body may be provided outside the vacuum space. The heat transfer path may be branched from the outside of the first space. The heat transfer path may be provided to be branched into a first path and a second path. The first direction may include a portion extending in the longitudinal direction of the vacuum space. The second path may include a portion extending in a direction different from that of the first path. The second path may include a portion extending in a direction away from the first path. The second path may include a portion extending in the longitudinal direction of the vacuum space. The second path may include a portion extending toward a rear surface portion of the vacuum adiabatic body. The second path may include a portion provided to be spaced apart from a front surface portion of the vacuum adiabatic body. The second path may include a portion extending toward a side surface portion of the vacuum adiabatic body. The second path may be in contact with a side surface portion of the vacuum adiabatic body. The second path may include a portion extending from the contact portion toward the rear surface portion of the vacuum adiabatic body. The first path may be provided to have a length less than that of the second path.

Optionally, the vacuum adiabatic body may include a heat transfer path provided in the side plate 15 or in a vicinity of the side plate 15. Examples related to the heat transfer path are as follows. The present disclosure may be any one of the following examples or a combination of two or more examples. The heat transfer path may be branched from the outside of the side plate. The heat transfer path may be provided to be branched into the first and second paths. The first path may be provided to pass through a portion of the side plate. For example, a portion of the side plate may include a portion extending in the height direction of the vacuum space 50. The second path may be provided to pass through another portion of the side plate. For example, the other portion of the side plate may include a portion extending in the longitudinal direction of the vacuum space.

Optionally, the vacuum adiabatic body may include a heat transfer path provided in at least a portion of the first and second plates or provided near the first and second plates. Examples related to the heat transfer path are as follows. The present disclosure may be any one of the following examples or a combination of two or more examples. The heat transfer path may be provided to be branched into the first and second paths. At least one of the first and second paths may be provided to pass through a portion of the first plate. For example, a portion of the first plate may include a portion extending from the first portion of the first plate, and the first portion may provide a wall defining the vacuum space. As another example, a portion of the first plate may include a portion extending in the longitudinal direction of the vacuum space. The other of the first and second paths may be provided at a portion of the side plate. A portion of the side plate may include a portion extending in a height direction of the vacuum space.

Optionally, the vacuum adiabatic body may include a heat transfer path provided at or near at least a portion of the heat transfer resistors 30, 31, 32, 60 and 63. Examples related to the heat transfer path are as follows. The present disclosure may be any one of the following examples or a combination of two or more examples. The heat transfer path may be provided to be branched into the first and second paths. At least a portion of the first and second paths may be provided to pass through a portion of the heat transfer resistor. For example, a portion of the heat transfer resistor may include a portion extending from the first portion of the heat transfer resistor, and the first portion may provide a wall defining the vacuum space. As another example, a portion of the heat transfer resistor may include a portion extending in a longitudinal direction of the vacuum space. The other of the first and second paths may be provided at a portion of the side plate 15. A portion of the side plate may include a portion extending in a height direction of the vacuum space.

The heat transfer resistor may be provided as a separate component that is separate from the first and second plates or may be provided integrally with at least a portion of the first and second plates. The heat transfer resistor may be provided as a separate component that is separated from the first plate and the second plate. The heat transfer resistor may be provided as one of the first plate and the second plate.

FIG. 25 is a cross-sectional view illustrating a peripheral portion of the vacuum adiabatic module, and FIG. 26 is a cross-sectional view of the vacuum adiabatic body.

Referring to FIGS. 25 and 26, as a length (L2-L1-L3) of the second portion 152 of the side plate increases, the more heat leakage increases. The second portion 152 of the side plate may include a portion in which the first straight portion 221 of the single body 210 and the first plate 10 are in contact with each other or coupled to each other. The length of the second portion 152 of the side plate may be the same as the length of the first straight portion 221. The conductive heat conducted along the first plate 10 may be rapidly conducted to the outside while riding over the single metal body 210. A distance L1 between an outer end of the first straight portion 221 and the third portion 203 of the second plate may be less than that of the second portion 203 of the side plate and/or the first straight portion 221. This is because, as the adiabatic distance L1 decreases, the adiabatic loss may be reduced.

A first heat leakage path (path 1) according to which the edge of the first straight portion 221 approaches the third portion 203 of the second plate, and/or a second heat leakage path (path 2) according to which a facing area of the first straight portion 221 and the second portion 202 of the second plate increases may occur. The first and second thermal leakage paths may interact with each other.

FIGS. 27 and 28 are views illustrating results obtained by comparing heat leakage as a length of a straight portion increases. FIG. 27 is a view illustrating the heat leakage of two paths, which are separated from each other, and FIG. 28 is a view illustrating the added heat leakage of the two paths.

Referring to FIGS. 27 and 28, the second heat leakage path may increase as the length of the first straight portion 221 increases. The first heat leakage path may gradually decrease as the length of the first straight portion 221 increases. The reason that the first thermal leakage path tends to decrease according to the length of the first straight portion 221 is because the second thermal leakage path becomes dominant. In other words, the second thermal leakage path may increase exponentially. This is because the adiabatic performance loss through the second heat leakage path increases rapidly, and thus, the heat leakage through the first heat leakage path decreases.

Referring back to FIGS. 25 and 26, the second portion 152 of the side plate may be provided with a seal for sealing the single body 210 and the first plate 10. For example, the sealing may be welding. The sealing may be a portion to be sealed by laser welding. The seal may seal the vacuum space 50. To provide the seal, a path through which the laser beam passes and/or an area on which a jig for allowing the plate to adhere is placed may be required. The first straight portion 221 may have a minimum length for the sealing. A size of the laser beam may be about 0.5 mm. A contact interval of the sealing jig on either side of the left and right sides is about 2 mm to about 3 mm. The length (L3-L2-L1) of the first straight portion 221 may be at least about 5 mm or more to provide a gap for the sealing jig provided on at least one side and a gap through which the laser beam passes. The interval of about 5 mm may be provided as an interval capable of supporting the single body 210 during a drawing process of processing the single body 210.

When the length of the first straight portion 221 is long, a foaming liquid may be introduced between the first plate 10 and the single body 210. The first plate 10 and the single body 210 may not be coupled outside of the seal. Another adiabatic body 90 may be filled with a foamed adiabatic body. The foam adiabatic body may be provided by being solidified after injection of a high-pressure foaming liquid. The foaming liquid may be foamed at a high pressure to fill a narrow corner of another adiabatic body 90. The high-pressure foaming liquid may be injected between the first plate 10 and the single body 210 at an edge of the first straight portion 221. The high-pressure foaming liquid may invade the seal to damage the seal or to peel the first plate 10. The damage of the seal may be concentrated on the corner portion 211 of the vacuum adiabatic body. This is because, in the corner portion 211, there are non-uniform in output of the laser beam, unevenness in member, and the like when the seal is provided. For this, the length of the first straight portion 221 may be limited to less than an interval between a pair of adjacent bars. When the pitch of the bar is about 23 mm, the length of the first straight portion 221 may be about 14+-3 mm.

The trapped air may be provided in the vicinity of the seal. The trapped air may be generated by propagation of deformation of the first plate 10 along the continue first plate 10 and/or a magnetic shape of the first straight portion 221. The air contained in the trapped air may be discharged in the vacuum exhaust process. The smaller the air in the trapped air, the shorter a process time of the vacuum exhaust process. The length of the first straight portion 221 may be shortened, and thus, a small space in which the trapped air is placed may be provided.

The length of the first straight portion 221 may be greater than the height of the vacuum space 50. The height of the vacuum space may be about 8 mm to about 9 mm. The length of the first straight portion 221 may be greater than about 9 mm. The heat conduction in the height direction of the vacuum space 50 and heat conduction in the longitudinal direction of the vacuum space 50 may match each other. An inner end of the first straight portion 221 may be in contact with the first curved portion 231 to conduct first conductive heat to a side of the second plate 20 and/or second conductive heat from the first straight portion 221 to an outer end of the first straight portion 221. The first conductive heat and the second conductive heat may have an equal degree in terms of total insulation loss of the vacuum adiabatic body. This is because if the heat loss in any one area is large, the corresponding area becomes the leakage point of the entire heat transfer system. Even if the length of the first straight portion 221 is greater than a certain range, another adiabatic body may be insulated.

The outer end of the first straight portion 221 may not be in contact with the third portion 203 of the second plate.

Thus, rapid heat conduction may be prevented. The height of the vacuum space 50 may be less than the distance L1 between the outer end of the first straight portion 221 and the third portion 203 of the second plate. Thus, the adiabatic performance loss due to the heat conduction between the outer end of the first straight portion 221 and the third portion 203 of the second plate may be reduced rather than the adiabatic performance loss of the vacuum space 50. Since the first straight portion 221 is a thick metal and is protected by another adiabatic body 90, an adiabatic performance effect may be obtained. However, the conductive heat flowing through the first straight portion 221 may reach a considerable amount. The heat loss between the outer end of the first straight portion 221 and the third portion 203 of the second plate may match the vacuum space 50, and thus, the adiabatic performance of the entire heat transfer system can be improved.

The height of the vacuum space 50 may be less than one half of the distance L1 between the outer end of the first straight portion 221 and the third portion 203 of the second plate. This is because the adiabatic performance of the vacuum space 50 is superior to that of another adiabatic body 90.

Referring to back FIGS. 27 and 28 again, when the length of the first straight portion 221 is half the length of the vacuum space 50, the heat leakage through the first straight portion 221 may be the lowest. The length of the first straight portion 221 may be equal to or more than half the height of the vacuum space 50. When the length of the first straight portion 221 is less than a quarter of the vacuum space 50, the heat leakage may rapidly increase. A length of the first straight portion 221 having the same heat leakage amount as the heat leakage amount when the length of the first straight portion 221 is one quarter of the vacuum space 50 may be defined. The length of the first straight portion 221 may be less than the adjacent distance (pitch of the bars) between the bars provided in another adiabatic body 90. The adjacent spacing between the bars may be provided as an interval of about 23 mm.

The first plate 10 may be in contact with a low-temperature space to serve as a passage through which cold air flows. The cold air conducted through a portion of the first plate 10 may be branched into the other portion of the first plate 10 and the single body 210. The cold air flowing through the first plate 10 may be branched from the side plate 15.

FIG. 29 is a view illustrating a passage path of branched cold air.

Referring to FIG. 29, the vacuum adiabatic body according to an embodiment may have a first passage that is branched from the first plate 10 to the second portion 152 of the side plate. The vacuum adiabatic body according to an embodiment may have a second passage that is branched from the first plate 10 to the first portion 151 of the side plate. Since the cold air is branched into the first passage and the second passage, the cold air flow may not be concentrated in the second passage. The concentration of the cold air flow may be blocked to reduce the dew formation on the second plate 20. In other words, the dew formation on the second straight portion 222 or the second plate 20 may be reduced by the first straight portion 221 or the second portion of the side plate.

To further improve efficiency of reducing the dew formation by the first straight portion 221, the first straight portion 221 may be configured as follows. First, the first straight portion 221 may be disposed in a direction away from the second straight portion 222. The first straight portion 221 may extend in a direction away from the second straight portion 222. Accordingly, it is possible to prevent the overlapping of the first passage and the second passage or the concentration passage of cold air. Second, the first straight portion 221 may be spaced apart from the second straight portion 222 in the height direction of the vacuum space 50. The first straight portion 221 may extend in the longitudinal direction of the vacuum space 50. The first straight portion 221 may extend in a direction opposite to the second straight portion 222. The first straight portion 221 may extend toward a side surface portion of the single body 210. The first straight portion 221 may extend to the side surface portion of the unitary body 210 while being spaced apart from the third straight portion 223. Accordingly, while reducing the thickness of the vacuum adiabatic body, the dew formation on the front portion of the vacuum adiabatic body may be reduced. The cold air moving to the front surface portion of the vacuum adiabatic body may move to the side surface portion of the vacuum adiabatic body.

If the first straight portion 221 is too long, cold transfer may increase. The reason may be a decrease in thickness of the insulating member surrounding the first straight portion 221 and an increase in heat conduction surface of the first straight portion 221 itself. As the first straight portion 221 is present, the dew formation may be prevented. If the first straight portion 221 is too long, the dew formation may increase inversely due to an increase in cold air transmission by the first straight portion 221. The dew condensation may also occur due to cold air conducted from the first straight portion 221 through another heat adiabatic body 90. An edge of the first straight portion 221 may not be in contact with the second plate 20. A length of the first straight portion 221 may be less than a pitch between bars of the support 30. The length of the first straight portion 221 may be less than the height of the vacuum space 50.

The first straight portion 221 may be provided to reduce an amount of cold air flowing through the third straight portion 223. The cold air flowing through the first passage may be less than that of the cold air flowing through the second passage. For this action, the first straight portion 221 may not be in contact with the single body 210. The first straight portion 221 may be disposed in a direction away from the second straight portion 222. The first straight portion 221 may extend in a direction away from the second straight portion 222.

INDUSTRIAL APPLICABILITY

According to the embodiment, the vacuum adiabatic body that is capable of being applied to real life may be provided.

The invention claimed is:

1. An adiabatic body comprising:

a first plate;

a second plate spaced from the first plate in a first direction to provide a vacuum space between the first plate and the second plate; and a side plate provided between the first plate to the second plate, the side plate having a first section extending outwardly of the vacuum space;

wherein the first plate comprises a wall defining the vacuum space, wherein a heat transfer path extends between a first space in a vicinity of the first plate and a second space in a vicinity of the second plate, wherein a length of the first section of the side plate is equal to or more than half a height of the vacuum space, and a distal edge of the first section of the side plate is not in contact with the second plate, wherein the first section has a portion configured to extend while contacting the first plate, and wherein the portion is surrounded by a material having a set heat conductivity.

2. The adiabatic body according to claim 1, wherein the heat transfer path is branched outside of the first space.

3. The adiabatic body according to claim 1, wherein the heat transfer path is branched into a first path and a second path.

4. The adiabatic body according to claim 3, wherein a portion of the second path extends in a second direction that differs from the first direction.

5. The adiabatic body according to claim 3, wherein a portion of the second path is spaced apart from a front surface of the adiabatic body.

6. The adiabatic body according to claim 3, wherein a portion of the second path extends toward a side surface of the adiabatic body.

7. The adiabatic body according to claim 6, wherein the second path extends to the side surface of the adiabatic body.

8. The adiabatic body according to claim 7, wherein a portion of the second path extends toward a rear surface of the adiabatic body.

9. The adiabatic body according to claim 3, wherein a portion of the first path extends in the first direction, and a portion of the second path extends in a second direction different from the first direction.

10. The adiabatic body according to claim 1, further comprising an insulating body provided outside the vacuum space, wherein:

the heat transfer path is branched inside the insulating body, the first section of the side plate is spaced apart from a first section of the second plate.

11. The vacuum adiabatic body according to claim 3, wherein a length of a portion of the first plate on which an insulating body is disposed is less than a distance between a distal edge of the first section of the side plate and a lateral edge of the vacuum adiabatic body.

12. The vacuum adiabatic body according to claim 1, wherein the vacuum adiabatic body is manufactured by a vacuum adiabatic body component manufacturing process of molding the first plate and the second plate in advance, a vacuum adiabatic body component assembly process of assembling the prepared first and second plates, and a vacuum adiabatic body vacuum exhaust process of discharging a gas in a space defined between the first plate and the second plate after the vacuum adiabatic body component assembly process.

13. The vacuum adiabatic body according to claim 1, wherein:

the first section of the side plate extends in a second direction different from the first direction, and a first path of the heat transfer path passes through the first section of the side plate.

14. The vacuum adiabatic body according to claim 1, wherein:

a second section of the side plate extends in the first direction, and a second path passes through the second section of the side plate.

15. The vacuum adiabatic body according to claim 1, wherein:

the first plate includes a first section configured to at least partially define the vacuum space, and a second section extending from the first section, and a second path passes through the second section of the first plate.

16. The vacuum adiabatic body according to claim 1, wherein the heat transfer path is branched from the side plate.

17. The adiabatic body according to claim 1, wherein the first section of the side plate includes a portion spaced apart from a first section of the second plate in the first direction, and the first section of the side plate does not contact the first section of second plate.

18. The vacuum adiabatic body according to claim 17, further comprising:

a heat transfer resistor configured to reduce an amount of heat transfer between the first plate and the second plate, wherein a first path passes through the heat transfer resistor, and a second path passes through the side plate.

19. The vacuum adiabatic body according to claim 18, wherein a first section of the heat transfer resistor is configured to define the vacuum space, and a second section is extending from the first section, and the first path is provided in the second section.

20. An appliance comprising the adiabatic body of claim 1.

* * * * *